(12) United States Patent
Yun et al.

(10) Patent No.: US 7,085,254 B1
(45) Date of Patent: *Aug. 1, 2006

(54) APPARATUS AND METHOD FOR GATED TRANSMISSION IN CDMA COMMUNICATION SYSTEM

(75) Inventors: Yu-Suk Yun, Seoul (KR); Soon Young Yoon, Seoul (KR); Seung-Joo Maeng, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 656 days.

This patent is subject to a terminal disclaimer.

(21) Appl. No.: 09/584,046

(22) Filed: May 30, 2000

(30) Foreign Application Priority Data

May 29, 1999 (KR) ................................ 1999-19647

(51) Int. Cl.
*H04B 7/216* (2006.01)
*H04B 7/00* (2006.01)

(52) U.S. Cl. ........................ 370/342; 370/335; 455/522

(58) Field of Classification Search ................ 370/335, 370/342, 345, 350; 455/522, 69
See application file for complete search history.

(56) References Cited

U.S. PATENT DOCUMENTS

| | | | | |
|---|---|---|---|---|
| 6,009,091 | A * | 12/1999 | Stewart et al. ............... | 370/342 |
| 6,266,321 | B1 * | 7/2001 | Pehkonen et al. ........... | 370/335 |
| 6,330,233 | B1 * | 12/2001 | Miya et al. .................. | 370/342 |
| 6,331,975 | B1 * | 12/2001 | Hosur et al. ................. | 370/342 |
| 6,334,047 | B1 * | 12/2001 | Andersson et al. ........... | 455/69 |
| 6,421,331 | B1 * | 7/2002 | Hulbert ........................ | 370/335 |
| 6,438,119 | B1 * | 8/2002 | Kim et al. .................... | 370/335 |
| 6,466,563 | B1 * | 10/2002 | Yamada ....................... | 455/522 |
| 6,545,989 | B1 * | 4/2003 | Butler ........................ | 370/335 |
| 6,643,272 | B1 * | 11/2003 | Moon et al. ................. | 455/522 |
| 6,744,778 | B1 * | 6/2004 | Allpress et al. ............. | 370/321 |
| 6,747,963 | B1 * | 6/2004 | Park et al. .................... | 370/335 |
| 2003/0099209 | A1 * | 5/2003 | Laakso et al. ............... | 370/311 |

FOREIGN PATENT DOCUMENTS

| | | |
|---|---|---|
| CN | 1175340 A | 3/1998 |
| EP | 612162 | 8/1994 |
| EP | 893889 A2 * | 1/1999 |
| JP | 11-1222 | 4/1999 |
| KR | 99-006849 | 1/1999 |
| WO | WO 93/18596 | 9/1993 |
| WO | WO 96/19902 | 6/1996 |
| WO | 9836508 * | 8/1998 |

OTHER PUBLICATIONS

Chinese Office Action dated Dec. 5, 2003 issued in a counterpart application, namely, Appln. No. 00818719.3.
Samsung Electronics Co., "Gated Transmission of DPCCH in DCH/DCH Control Only Substates", TSG-RAN Working Group 1 Meeting #3, Apr. 18-20, 1999.
NTT DoCoMo, "Detail Description of Transmission Stop and Resumption Control", TSG-RAN Working Group 1 (Radio) Meeting #3, Mar. 22-26, 1999.
UTRA FDD: Physical Layer Procedures, TS 25.214 v.1.0.0 (Apr. 1999).

* cited by examiner

*Primary Examiner*—Steven Nguyen
(74) *Attorney, Agent, or Firm*—Dilworth & Barrese LLP

(57) ABSTRACT

A method for transmitting a frame comprised of a plurality of slots over a dedicated control channel in a duration where there is no transmission message from a mobile station to a base station. Each slot in the frame is comprised of a first slot duration and a second slot duration. The first slot duration is provided with a power control signal and the second slot duration is provided with no signal at a partial duration thereof.

5 Claims, 27 Drawing Sheets

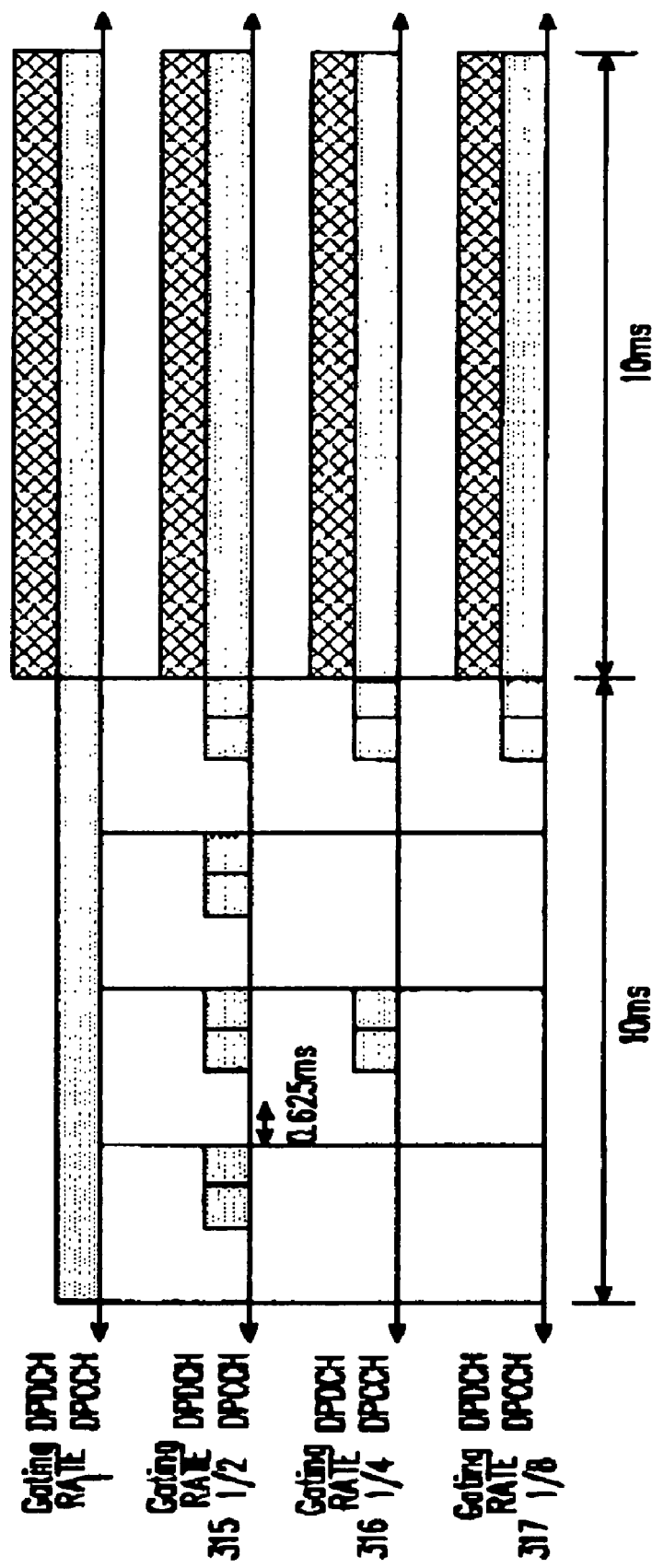

APPARATUS AND METHOD FOR GATED TRANSMISSION IN CDMA COMMUNICATION SYSTEM

PRIORITY

This application claims priority to an application entitled "Apparatus and Method for Gated Transmission in CDMA Communication System" filed in the Korean Industrial Property Office on May 29, 1999 and assigned Ser. No. 99-19647, the contents of which are hereby incorporated by reference.

BACKGROUND OF THE INVENTION

1. Field of the Invention

The present invention relates generally to a CDMA mobile communication system, and in particular, to an apparatus and method for gated transmission that assigns channels and does not require a separate resynchronization process.

2. Description of the Related Art

A conventional CDMA (Code Division Multiple Access) mobile communication system primarily provides voice services. However, the future CDMA mobile communication system will support the IMT-2000 standard, which provides a high-speed data service as well as the voice service. More specifically, the IMT-2000 standard provides a high-quality voice service, a moving picture service, and an Internet search service.

In a mobile communication system, a data communication service typically alternates between a transmission of burst data period and a long non-transmission periods. The bursts of data are referred to as "packets" or "packages" of data. In the next generation communication systems, traffic data is transmitted over a dedicated traffic channel for a data transmission duration, and the dedicated traffic channel is maintained for a predetermined time even when a base station and a mobile station have no traffic data to transmit. The mobile communication system transmits the traffic data over the dedicated traffic channel for the data transmission duration and maintains the dedicated traffic channel between the base station and the mobile station for a predetermined time even when there is no traffic data to transmit in order to minimize a time delay due to sync reacquisition when there is traffic data to transmit.

The invention will be described with reference to a UTRA (UMTS (Universal Mobile Telecommunications System) Terrestrial Radio Access) mobile communication system. Such a mobile communication system requires many states according to channel assignment circumstances and the existence/nonexistence of state information in order to provide a packet data service as well as a voice service.

FIG. 1A shows state transition in the cell connected state of the mobile communication system. Referring to FIG. 1A, the cell connected state includes a paging channel (PCH) state, a random access channel (RACH)/downlink shared channel (DSCH) state, a RACH/forward link access channel (FACH) state, and a dedicated channel (DCH)/DCH, DCH/DCH+DSCH, DCH/DSCH+DSCH Ctrl (Control Channel) state.

FIG. 1B shows a user data active substate and a control-only substate of the DCH/DCH, DCH/DCH+DSCH, DCH/DSCH+DSCH Ctrl state. It should be noted that the novel gated transmission device and method is applied to a state where there is no traffic data to transmit for a predetermined time (e.g., DCH/DCH control-only substate).

The existing CDMA mobile communication system which mainly provides the voice service releases a channel after completion of data transmission and connects the channel again when there is further data to transmit. However, in providing the packet data service as well as the voice service, the conventional data transmission method has many delaying factors such as a reconnection delay, thus making it difficult to provide a high-quality service. Therefore, to provide the packet data service as well as the voice service, an improved data transmission method is required. For example, in many cases, data transmission is performed intermittently for Internet access and file downloading. Thus, there are transmission and non-transmission periods. During the non-transmission period, the conventional data transmission method releases or maintains the traffic (or data) channel(DPDCH OR DSCH) and associated control channel(DPCCH). Releasing the traffic channel and associated control channel require a long time to reconnect the channels, and maintaining the traffic channel and associated control channel waste the channel resources.

A downlink (or forward link) for transmitting signals from the base station to the mobile station or an uplink (or reverse link) for transmitting signals from the mobile station to the base station includes the following physical channels. The physical channels include a dedicated physical control channel (hereinafter, referred to as DPCCH) in which pilot symbols are included for sync acquisition and channel estimation, and a dedicated physical data channel (hereinafter, referred to as DPDCH) for exchanging traffic data with a specific mobile station. The downlink DPDCH includes the traffic data, and the downlink DPCCH includes, at each slot (or power control group), transport format combination indicator (hereinafter, referred to as TFCI) which is information about the format of transmission data, transmit power control (hereinafter, referred to as TPC) information which is a power control command, and control information such as the pilot symbols for providing a reference phase so that a receiver (the base station or the mobile station) can compensate the phase. The DPDCH and the DPCCH are time multiplexed within one power control group and the DPDCH and DPCCH signals are spread with one orthogonal code in downlink, and DPDCH and DPCCH signals are separated by using different orthogonal codes in the uplink.

For reference, the invention will be described with reference to a case where a frame length is 10 msec and each frame includes 16 or 15 power control groups (PCGs), i.e., each power control group has a length of 0.625 msec or 0.667 msec. It will be assumed herein that the power control group (0.625 msec or 0.667 ms) has the same time period as the slot (0.625 msec or 0.667 ms). The power control group (or slot) is comprised of pilot symbol, traffic data, transmission data format concerning information TFCI, and power control information TPC. The values stated above are given by way of example only.

FIG. 2A shows a slot structure including the downlink DPDCH and DPCCH. In FIG. 2A, although the DPDCH is divided into traffic data 1 and traffic data 2, there is a case where the traffic data 1 does not exist and only the traffic data 2 exists according to the types of the traffic data. Table 1 below shows the symbols constituting the downlink DPDCH/DPCCH fields, wherein the number of TFCI, TPC and pilot bits in each slot can vary according to a data rate and a spreading factor.

Unlike the downlink DPDCH and DPCCH, uplink DPDCH and DPCCH for transmitting signals from the mobile station to the base station are separated by channel separation codes.

FIG. 2B shows a slot structure including the uplink DPDCH and DPCCH. In FIG. 2B, the number of TFCI, FBI (FeedBack Information), TPC and pilot bits can vary according to the circumstances influencing the type of the traffic data, such as a provided service, transmit antenna diversity, or a handover (or handoff). The FBI is information about two antennas that the mobile station requests, when the base station uses transmit diversity antennas. Tables 2 and 3 below show the symbols constituting the uplink DPDCH and DPCCH fields, respectively.

fourth DPDCHs according to the service types. Further, the downlink and uplink both may include several DPDCHs. Here, SF indicates a Spreading Factor.

A hardware structure of the conventional mobile communication system (base station transmitter and mobile station transmitter) will be described below with reference to FIGS. 3A and 3B. Although the base station transmitter and mobile station transmitter will be described with reference to three DPDCHs, the number of DPDCHs is not limited.

TABLE 1

Downlink DPDCH/DPCCH Fields

| Channel Bit Rate (kbps) | Channel Symbol Rate (ksps) | SF | Bits/Frame | | | Bits/Slot | DPDCH Bits/Slot | | DPCCH Bits/Slot | | |
|---|---|---|---|---|---|---|---|---|---|---|---|
| | | | DPDCH | DPCCH | TOT | | $N_{data1}$ | $N_{data2}$ | $N_{TFCI}$ | $N_{TPC}$ | $N_{pilot}$ |
| 16 | 8 | 512 | 64 | 96 | 160 | 10 | 2 | 2 | 0 | 2 | 4 |
| 16 | 8 | 512 | 32 | 128 | 160 | 10 | 0 | 2 | 2 | 2 | 4 |
| 32 | 16 | 256 | 160 | 160 | 320 | 20 | 2 | 8 | 0 | 2 | 8 |
| 32 | 16 | 256 | 128 | 192 | 320 | 20 | 0 | 8 | 2 | 2 | 8 |
| 64 | 32 | 128 | 480 | 160 | 640 | 40 | 6 | 24 | 0 | 2 | 8 |
| 64 | 32 | 128 | 448 | 192 | 640 | 40 | 4 | 24 | 2 | 2 | 8 |
| 128 | 64 | 64 | 1120 | 160 | 1280 | 80 | 14 | 56 | 0 | 2 | 8 |
| 128 | 64 | 64 | 992 | 288 | 1280 | 80 | 6 | 56 | 8 | 2 | 8 |
| 256 | 128 | 32 | 2400 | 160 | 2560 | 160 | 30 | 120 | 0 | 2 | 8 |
| 256 | 128 | 32 | 2272 | 288 | 2560 | 160 | 22 | 120 | 8 | 2 | 8 |
| 512 | 256 | 16 | 4832 | 288 | 5120 | 320 | 62 | 240 | 0 | 2 | 16 |
| 512 | 256 | 16 | 4704 | 416 | 5120 | 320 | 54 | 240 | 8 | 2 | 16 |
| 1024 | 512 | 8 | 9952 | 288 | 10240 | 640 | 126 | 496 | 0 | 2 | 16 |
| 1024 | 512 | 8 | 9824 | 416 | 10240 | 640 | 118 | 496 | 8 | 2 | 16 |
| 2048 | 1024 | 4 | 20192 | 288 | 20480 | 1280 | 254 | 1008 | 0 | 2 | 16 |
| 2048 | 1024 | 4 | 20064 | 416 | 20480 | 1280 | 246 | 1008 | 8 | 2 | 16 |

TABLE 2

Uplink DPDCH Fields

| Channel Bit Rate (kbps) | Channel Symbol Rate (ksps) | SF | Bits/Frame | Bits/Slot | $N_{data}$ |
|---|---|---|---|---|---|
| 16 | 16 | 256 | 160 | 10 | 10 |
| 32 | 32 | 128 | 320 | 20 | 20 |
| 64 | 64 | 64 | 640 | 40 | 40 |
| 128 | 128 | 32 | 1280 | 80 | 80 |
| 256 | 256 | 16 | 2560 | 160 | 160 |
| 512 | 512 | 8 | 5120 | 320 | 320 |
| 1024 | 1024 | 4 | 10240 | 640 | 640 |

TABLE 3

Uplink DPCCH Fields

| Channel Bit Rate (kbps) | Channel Symbol Rate (ksps) | SF | Bits/Frame | Bits/Slot | $N_{pilot}$ | $N_{TPC}$ | $N_{TFCI}$ | $N_{FBI}$ |
|---|---|---|---|---|---|---|---|---|
| 16 | 16 | 256 | 160 | 10 | 6 | 2 | 2 | 0 |
| 16 | 16 | 256 | 160 | 10 | 8 | 2 | 0 | 0 |
| 16 | 16 | 256 | 160 | 10 | 5 | 2 | 2 | 1 |
| 16 | 16 | 256 | 160 | 10 | 7 | 2 | 0 | 1 |
| 16 | 16 | 256 | 160 | 10 | 6 | 2 | 0 | 2 |
| 16 | 16 | 256 | 160 | 10 | 5 | 1 | 2 | 2 |

Tables 1 to 3 show an example where one DPDCH is a traffic channel. However, there may exist second, third and FIG. 3A shows a structure of the conventional base station transmitter. Referring to FIG. 3A, multiplier 111 multiply a DPCCH signal by gain coefficient G1, multipliers 121, 131 and 132 multiply $DPDCH_1$, $DPDCH_2$ and $DPDCH_3$ signals, which have undergone channel encoding and interleaving, by gain coefficients $G_2$, $G_3$ and $G_4$, respectively. The gain coefficients $G_1$, $G_2$, $G_3$ and $G_4$ may have different values according to circumstances such as the service option and the handover. A multiplexer (MUX) 112 time-multiplexes the DPCCH signal and the $DPDCH_1$, signal into the slot structure of FIG. 2A. A first serial-to-parallel (S/P) converter 113 distributes the output of the multiplexer 112 to an I channel and a Q channel. Second and third S/P converters 133 and 134 S/P-convert the $DPDCH_2$ and $DPDCH_3$ signals and distribute them to the I channel and the Q channel, respectively. The S/P converted I and Q channel signals are multiplied by channelization codes $C_{ch1}$, $C_{ch2}$ and $C_{ch3}$ in multipliers 114, 122, 135, 136, 137 and 138, for spreading and channel separation. Orthogonal codes are used for the channelization codes. The I and Q channel signals multiplied by the channelization codes in the multipliers 114, 122, 135, 136, 137 and 138 are summed by first and second summers 115 and 123, respectively. That is, the I channel signals are summed by the first summer 115, and the Q channel signals are summed by the second summer 123. The output of the second summer 123 is phase shifted by 90° by a phase shifter 124. A summer 116 sums an output of the first summer 115 and an output of the phase shifter 124 to generate a complex signal I+jQ. A multiplier 117 scrambles the complex signal with a PN sequence $C_{scramb}$ which is uniquely assigned to each base station, and a signal separator 118 separates the scrambled signal into a real part and an imaginary part and distributes them to the I channel and the Q channel. The I and Q channel outputs of the signal separator 118 are filtered by lowpass filters 119 and 125, respectively, to generate bandwidth-limited signals. The output signals of the filters 119 and 125 are multiplied by carriers $\cos\{2\pi f_c t\}$ and $\sin\{2\pi f_c t\}$ in multipliers 120 and 126, respectively, to frequency shift the signals to a radio frequency (RF) band. A summer 127 sums the frequency-shifted I and Q channel signals.

FIG. 3B shows a structure of the conventional mobile station transmitter. Referring to FIG. 3B, multipliers 211, 221, 223 and 225 multiply a DPCCH signal and $DPDCH_1$, $DPDCH_2$ and $DPDCH_3$ signals, which have undergone channel encoding and interleaving, by channelization codes $C_{ch1}$, $C_{ch2}$, $C_{ch3}$ and $C_{ch4}$, respectively, for spreading and channel separation. Orthogonal codes are used for the channelization codes. The output signals of the multipliers 211, 221, 223 and 225 are multiplied by gain coefficients $G_1$, $G_2$, $G_3$ and $G_4$ in multipliers 212, 222, 224 and 226, respectively. The gain coefficients $G_1$, $G_2$, $G_3$ and $G_4$ may have different values. The outputs of the multipliers 212 and 222 are summed by a first summer 213 and output as an I channel signal, and the outputs of the multipliers 224 and 226 are summed by a second summer 227 and output as a Q channel signal. The Q channel signal output from the second summer 227 is phase shifted by 90° in a phase shifter 228. A summer 214 sums the output of the first summer 213 and the output of the phase shifter 228 to generate a complex signal I+jQ. A multiplier 215 scrambles the complex signal with a PN sequence $C_{scramb}$ which is uniquely assigned to each base station, and a signal separator 229 separates the scrambled signal into a real part and an imaginary part and distributes them to the I channel and the Q channel. The I and Q channel outputs of the signal separator 229 are filtered by lowpass filters 216 and 230, respectively, to generate bandwidth-limited signals. The output signals of the filters 216 and 230 are multiplied by carriers $\cos\{2\pi f_c t\}$ and $\sin\{2\pi f_c t\}$ in multipliers 217 and 231, respectively, to frequency shift the signals to a radio frequency (RF) band. A summer 218 sums the frequency-shifted I and Q channel signals.

A conventional transmission signal structure of the base station and the mobile station will be made below. FIG. 5A shows how to transmit the downlink DPCCH and the uplink DPCCH when transmission of the uplink DPDCH is discontinued in a state where there is no data to transmit for a predetermined time.

FIG. 5B shows how to transmit the downlink DPCCH and the uplink DPCCH when transmission of the downlink DPDCH is discontinued in a state where there is no data to transmit for a predetermined time. As illustrated in FIGS. 5A and 5B, the mobile station constantly transmits the uplink DPCCH signal even when the DPDCH data is not existing in order to avoid a resync acquisition process in the base station. When there is no traffic data to transmit for a long time in the control-only substate, the base station and the mobile station make a transition to an RRC (Radio Resource Control) connection release state (not shown). In this state, transmission of the uplink DPDCH is discontinued, but the mobile station transmits pilot symbols and power control bits over the DPCCH until the transition is recoved, thereby increasing an interference of the uplink. The increase in interference of the uplink causes a decrease in the capacity of the uplink.

In the conventional method, although continuous transmission of the uplink DPCCH in the control-only substate is advantageous in that it is possible to avoid the sync reacquisition process in the base station, it creases an interference to the uplink, and decreases the capacity of the uplink. Further, in the downlink, continuous transmission of the uplink power control bits increases interference in the downlink and decreases the capacity of the downlink. Therefore, it is necessary to minimize a time required for the sync reacquisition process in the base station, decrease the interference due to transmission of the uplink DPCCH and decrease the interference due to transmission of the uplink power control bits over the downlink.

SUMMARY OF THE INVENTION

It is, therefore, an object of the present invention to provide a communication device and method for minimizing a time required for a sync reacquisition process in the base station when a traffic data does not exist for a predetermined time, control-only substate, for decreasing interference due to continuous transmission of an uplink DPCCH and for decreasing interference due to the transmission of uplink power control bits over a downlink.

It is another object of the present invention to provide a device and method for gated transmission of uplink DPCCH signal in a partial period of a power control group in a mobile communication system.

It is further another object of the present invention to provide a device and method for improving a downlink cell capacity and receiving performance by gating an uplink DPCCH signal in a partial period of the power control group in a mobile communication system.

To achieve the above and other objects, there is provided a method for transmitting a frame comprised of a plurality of slots over a dedicated control channel in a duration where there is no transmission message from a mobile station to a base station. Each slot in the frame is comprised of a first slot duration and a second slot duration. The first slot duration is provided with a power control signal and the second slot duration is provided with no signal at a partial duration thereof.

BRIEF DESCRIPTION OF THE DRAWINGS

The above and other objects, features and advantages of the present invention will become more apparent from the following detailed description when taken in conjunction with the accompanying drawings in which:

FIG. 7B is a diagram illustrating another method for transmitting a signal when an uplink DPDCH message is generated while an uplink DPCCH is intermittently transmitted in a control-only substate of the invention;

DETAILED DESCRIPTION OF THE PREFERRED EMBODIMENT

Figure 1A:
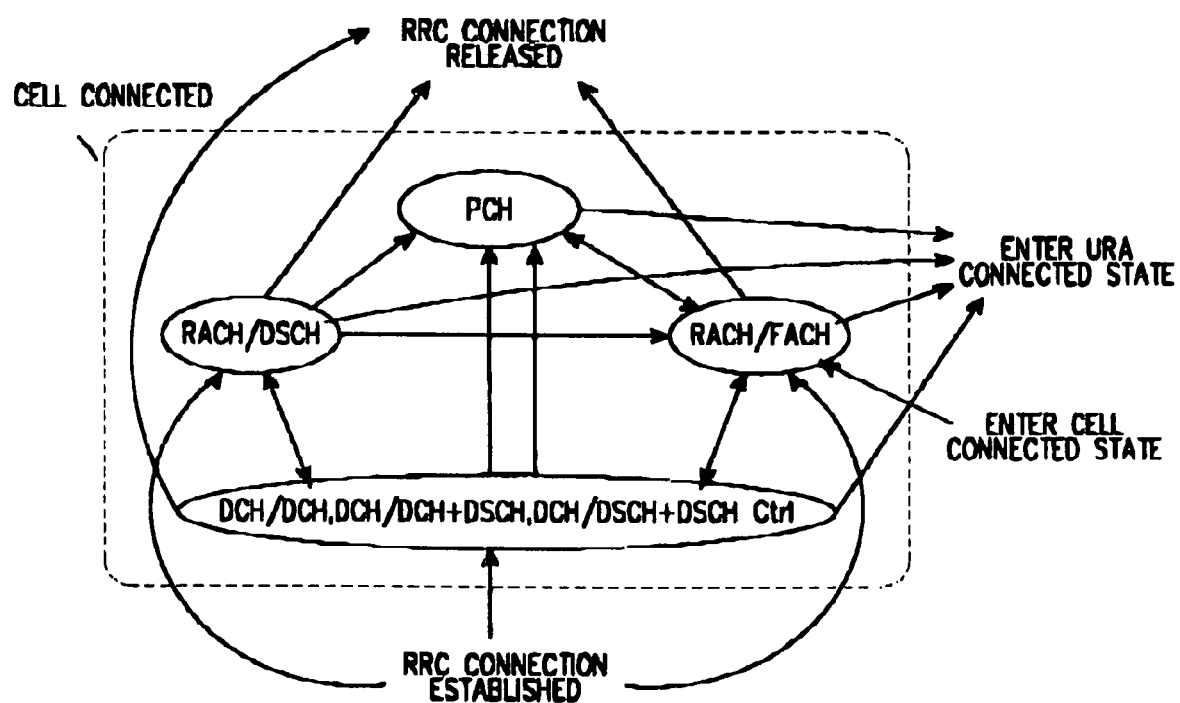
FIG. 1A is a state transition diagram for a packet data service.
Figure 1B:
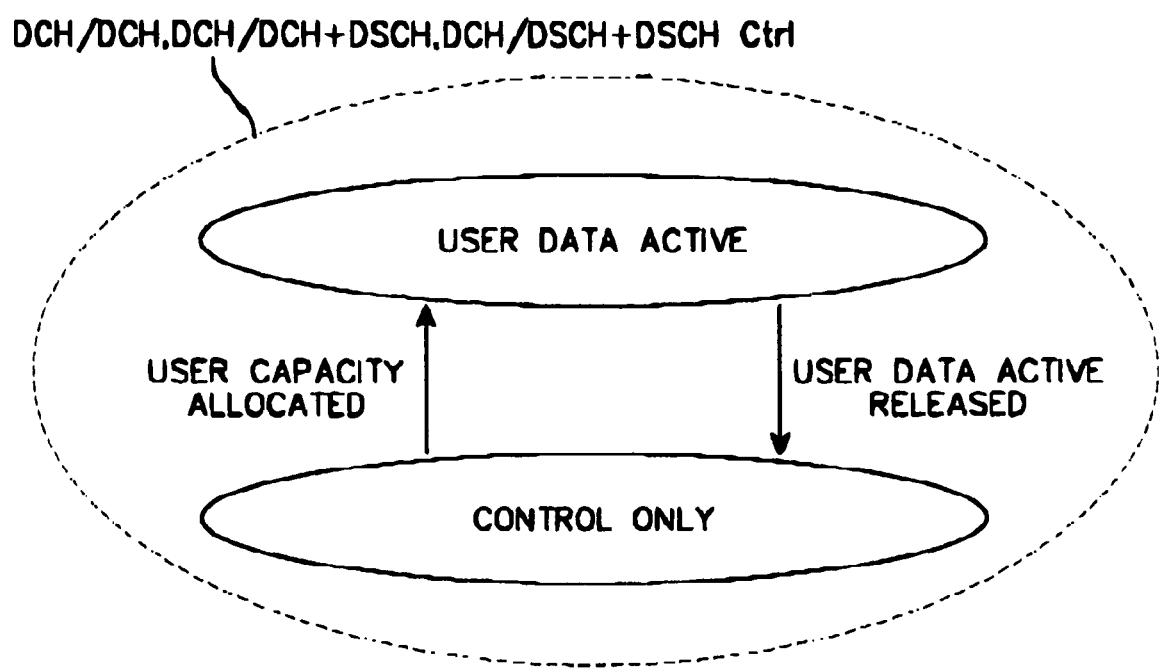
FIG. 1B is a state transition diagram between a user data active substate and a control-only substate of the DCH/DCH state.
Figure 2A:
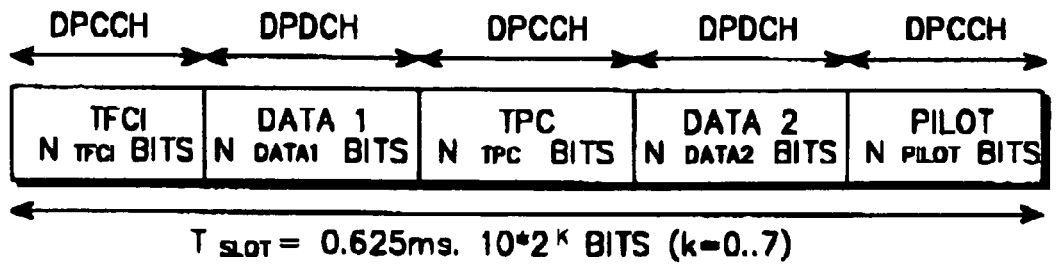
FIG. 2A is a diagram illustrating a slot structure of downlink DPDCH and DPCCH.
Figure 2B:
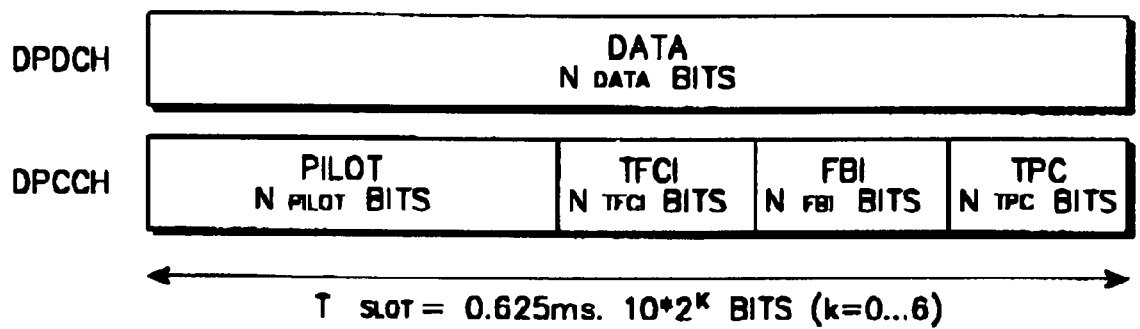
FIG. 2B is a diagram illustrating a slot structure of uplink DPDCH and DPCCH.

A preferred embodiment of the present invention will be described herein below with reference to the accompanying drawings. In the following description, well-known functions or constructions are not described in detail since they would obscure the invention in unnecessary detail.

The term "normal transmission" as used herein refers to continuously transmitting DPCCH signal, control information included in the downlink DPCCH, i.e., TFCI, TPC and pilot symbols or control information included in the uplink DPCCH, ie., TFCI, TPC, FBI and pilot symbols. Further, the term "gate transmission" refers to transmitting the control information included in the downlink DPCCH (i.e., TFCI, TPC and pilot symbols) only at a specific power control group (or slot) according to a predetermined time pattern. In addition, the term "gate transmission" refers to transmitting the control information included in the uplink DPCCH (i.e., TFCI, TPC, FBI and pilot symbols) only at a specific power control group (or slot) according to a predetermined time pattern. The information, transmission of which is discontinued in the downlink DPCCH during gated transmission, may include all of the TFCI, TPC and pilot symbols in an nth power control group (or one slot), or may include the pilot symbols in an nth power control group (or one slot), and TFCI and TPC in an (n+1)th power control group. The information, transmission of which is discontinued in the uplink DPCCH during gated transmission, includes all of TFCI, TPC, FBI and pilot symbols in a specific power control group (or one slot). Herein, "a gated transmission unit is identical to a slot unit" means that TFCI, TPC and pilot symbols within one power control group are set as a gated transmission unit in uplink. Further, "a gated transmission unit is not identical to a slot unit" means that an nth pilot symbol and (n+1)th TFCI and TPC are set as a gated transmission unit in downlink.

In addition, since performance of a frame beginning part is very important, the invention locates the TPC for controlling power of the first slot of the next frame at the last slot of one frame. That is, TPC bits for the downlink DPCCH and the uplink DPCCH are located at the last slot of the nth frame, and power of the first slot of the (n+1)th frame is controlled using the TPC bits existing at the last slot of the nth frame.

Further, a power control rate can be maintained even when transmission data is generated during gated transmission of the control information according to the present invention. That is, gating of power control information (TPC) is maintained even when transmission data is generated during gated transmission of the control information. In addition, a gating pattern (or gated transmission pattern) for the downlink DPCCH and a gating pattern for the uplink DPCCH are determined to have an offset. That is, the control information for the downlink DPCCH and the control information for the uplink DPCCH are transmitted at different time points.

A hardware structure according to an embodiment of the invention will be described below.

Figure 3A:
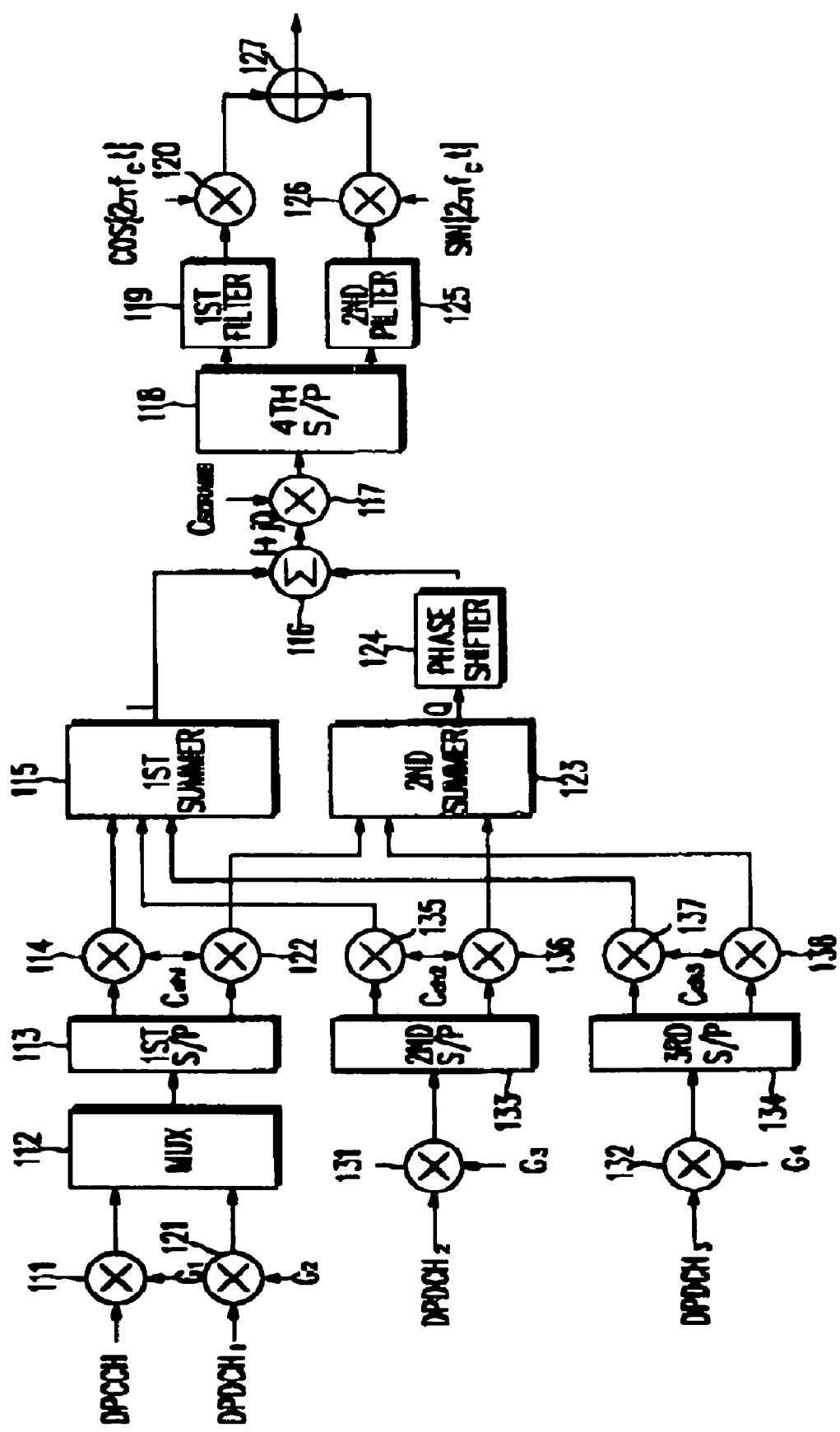
FIG. 3A is a diagram illustrating a structure of a conventional base station transmitter.
Figure 4A:
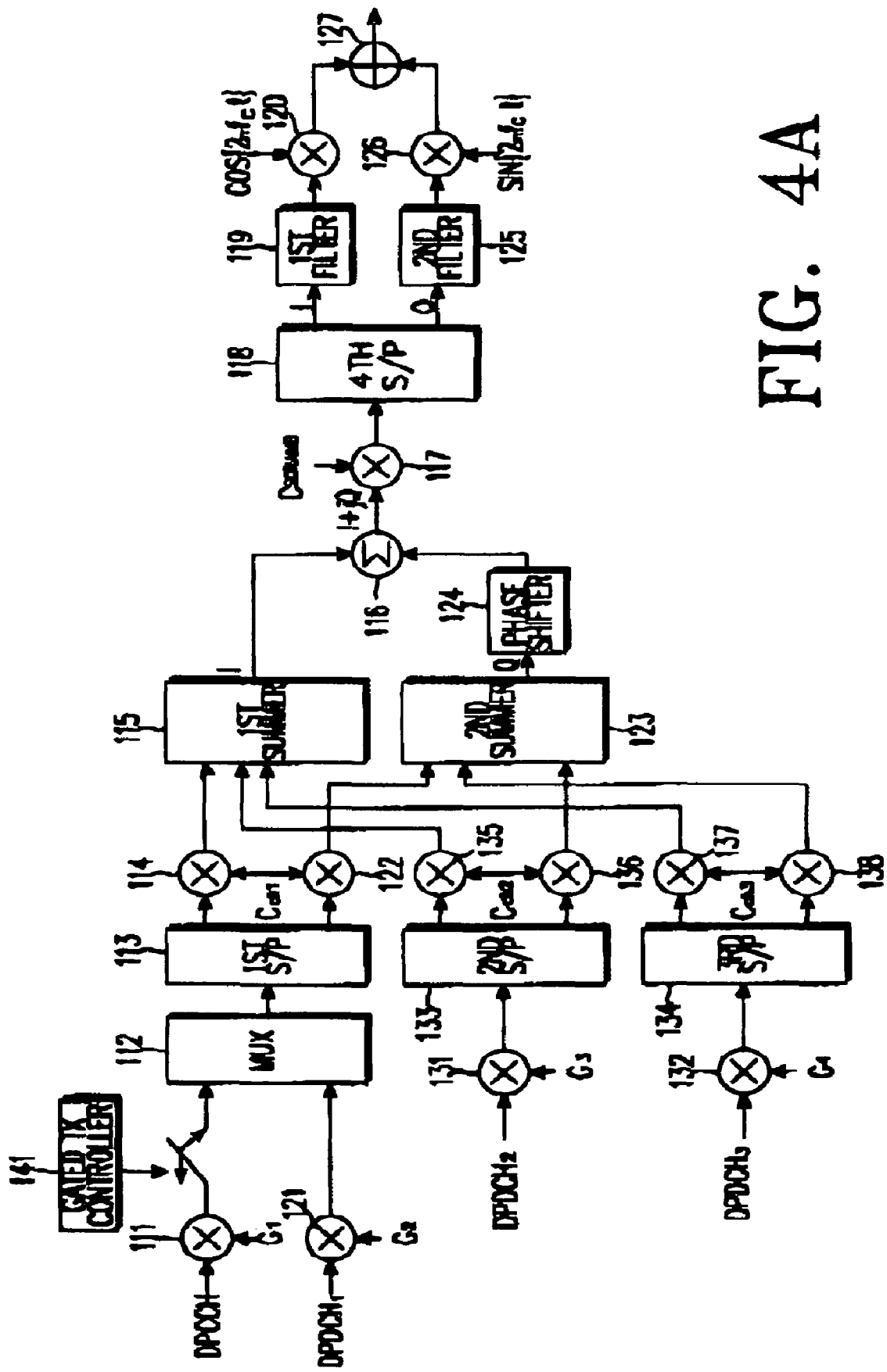
FIG. 4A is a diagram illustrating a structure of a base station transmitter according to an embodiment of the present invention.

FIG. 4A shows a structure of a base station transmitter according to an embodiment of the present invention. The base station transmitter is different from the conventional one of FIG. 3A in that with regard to the downlink DPCCH, the output of the multiplier 111 is gated by a gated transmission controller 141. That is, the gated transmission controller 141 performs gated transmission on the TFCI and TPC bits for the downlink DPCCH at a power control group (or time slot) scheduled with the mobile station in a state where the traffic data is not transmitted over the downlink and uplink DPDCHs for a predetermined period of time. In addition, the gated transmission controller 141 performs gated transmission on one power control group (or one entire slot) including the pilot symbols, TFCI and TPC bits for the downlink DPCCH at a power control group (or time slot) scheduled with the mobile station in a state where the traffic data is not transmitted over the downlink and uplink DPDCHs for a predetermined period of time.

Although the downlink gated transmission pattern is identical to the uplink gated transmission pattern, an offset may exist between them for efficient power control. The offset is given as a system parameter.

The gated transmission controller 141 can perform gated transmission either when the gated transmission unit is identical to the slot unit or when the gated transmission unit is not identical to the slot unit. When the gated transmission unit is not identical to the slot unit, the gated transmission controller 141 separately gates the TFCI, TPC and pilot symbols. That is, nth pilot symbol, (n+1)th TFCI and TPC are set as a gated transmission unit.

In addition, the gated transmission controller 141 locates the TPC bits for power controlling the first slot of the next frame at the last slot of one frame to secure performance on a beginning part of the next frame. That is, the TPC bits for the downlink DPCCH and the uplink DPCCH are located at the last slot of the nth frame, and power of the first slot of the (n+1)th frame is controlled using the TPC bits existing at the last slot of the nth frame.

Figure 3B:
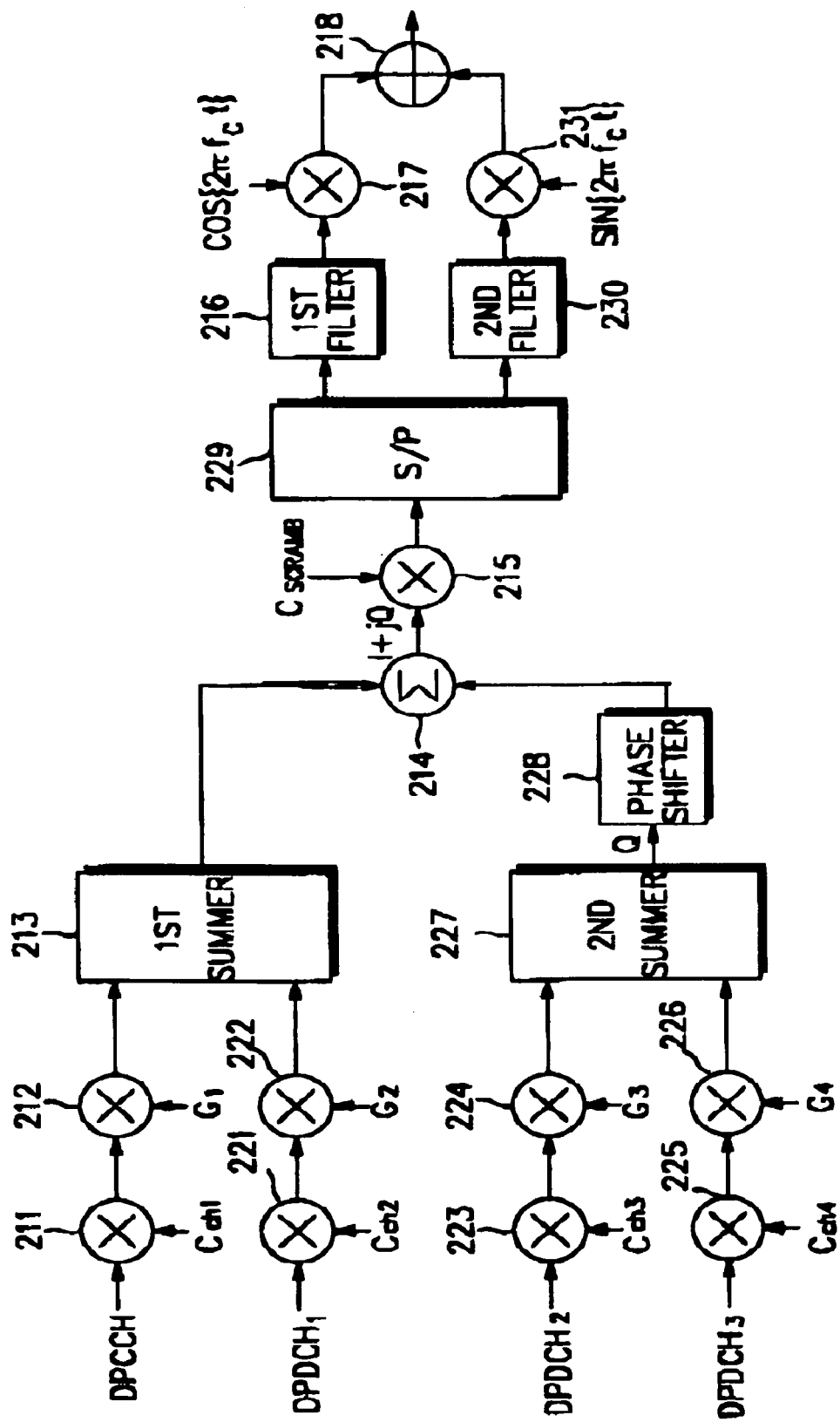
FIG. 3B is a diagram illustrating a structure of a conventional mobile station transmitter.
Figure 4B:
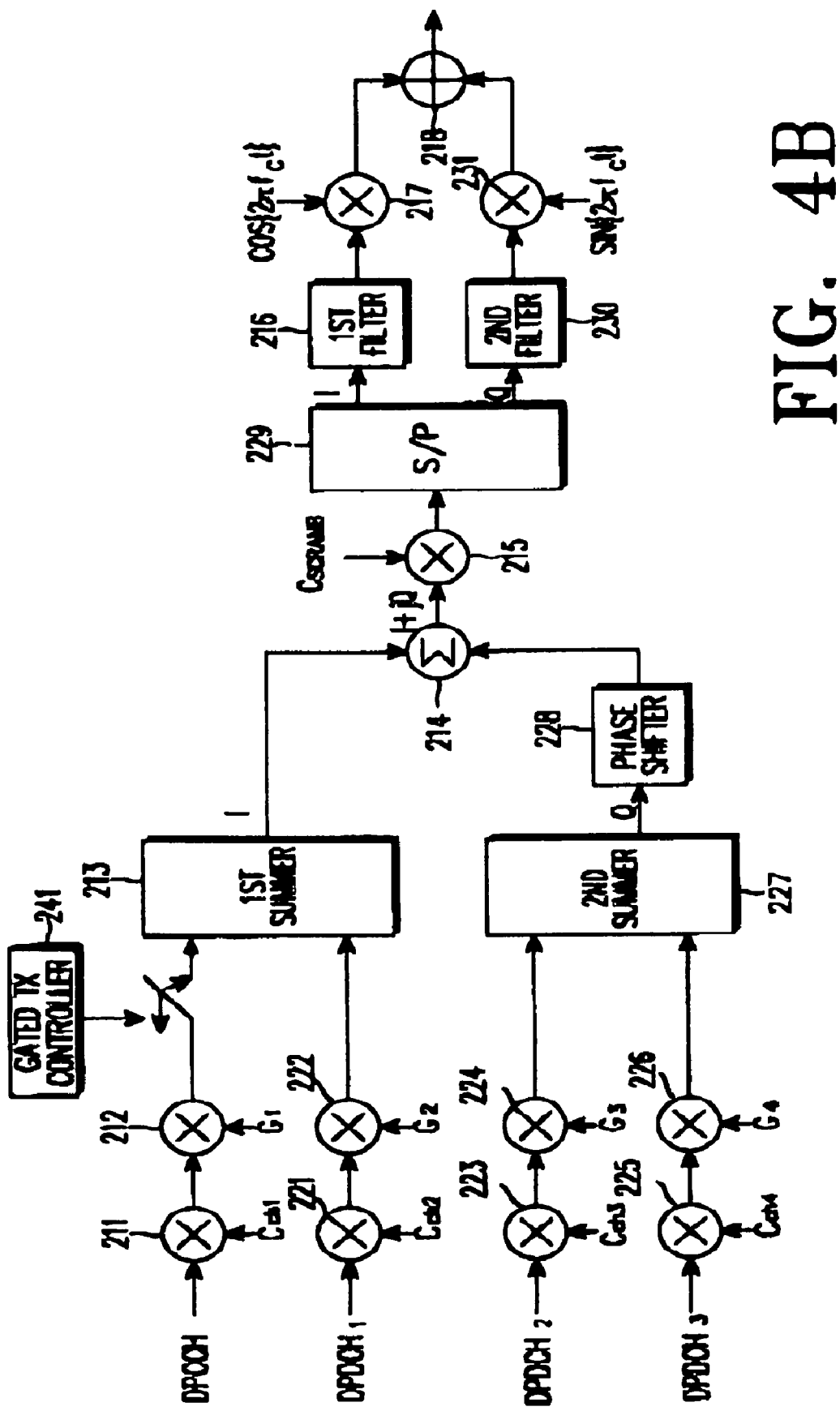
FIG. 4B is a diagram illustrating a structure of a mobile station transmitter according to an embodiment of the present invention.
Figure 5A:
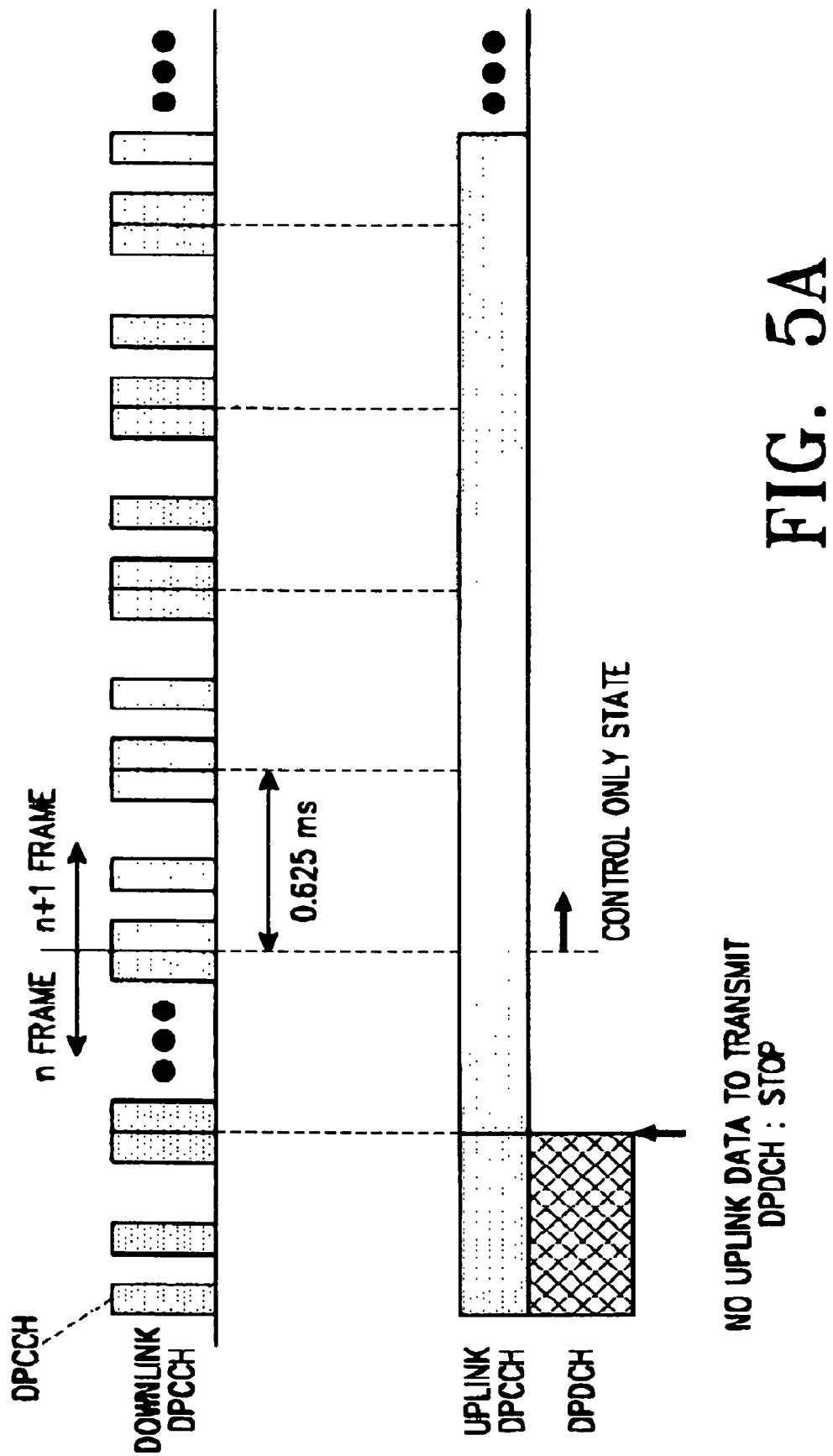
FIG. 5A is a diagram for explaining how to transmit a downlink DPCCH and an uplink DPCCH when transmission of an uplink DPDCH is discontinued in a conventional control-only substate.
Figure 5B:
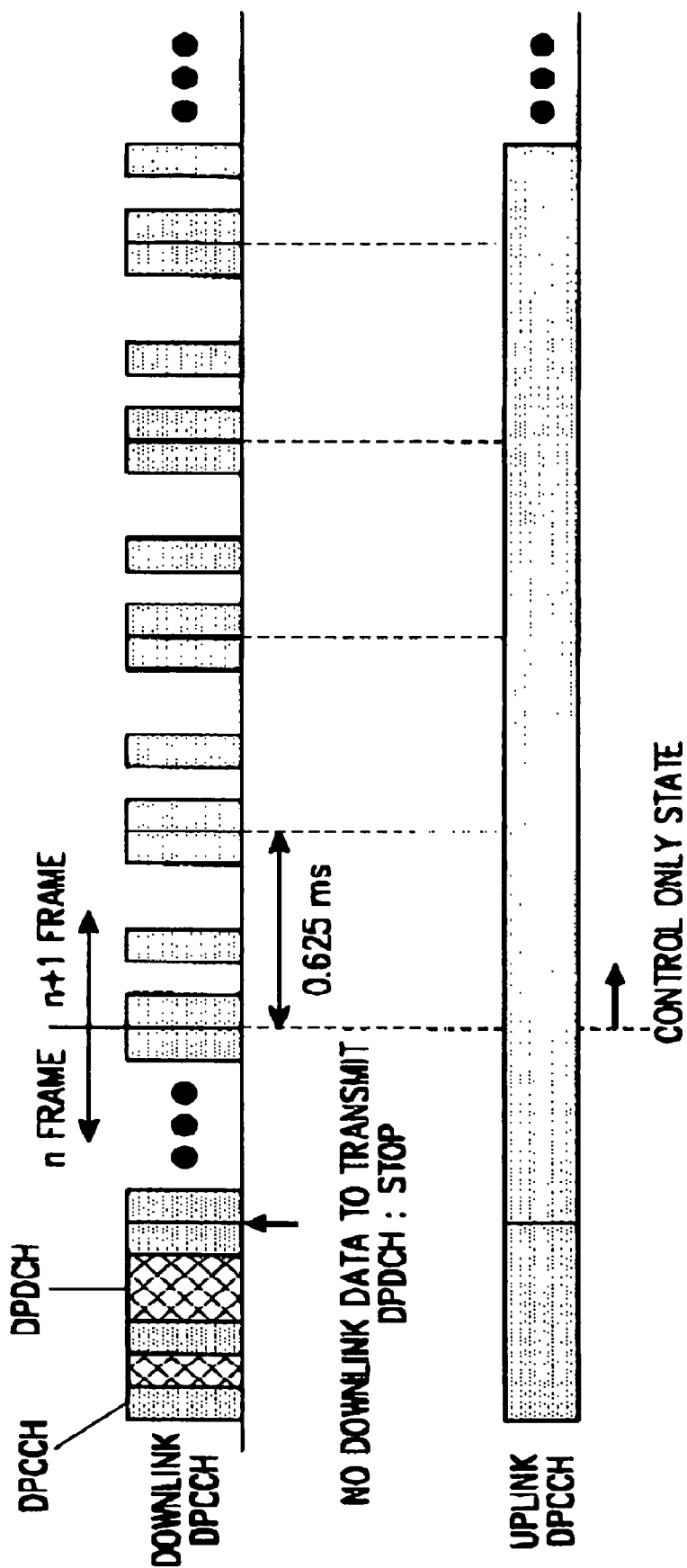
FIG. 5B is a diagram for explaining how to transmit a downlink DPCCH and an uplink DPCCH when transmission of a downlink DPDCH is discontinued in the conventional control-only substate.

FIG. 4B shows a structure of a mobile station transmitter according to an embodiment of the present invention. The mobile station transmitter is different from the conventional one of FIG. 3B in that a gated transmission controller 241 is provided to gate transmission of the uplink DPCCH. That is, the gated transmission controller 241 performs gated transmission on one power control group (or one entire slot) or ½ the power control group including the pilot symbols, TFCI, FBI and TPC bits for the uplink DPCCH at a power control group (or time slot) scheduled with the mobile station in the control-only substate where the traffic data is not transmitted over the downlink and uplink DPDCHs. For sync detection, it is necessary to transmit the pilot symbols and TPC bits over the uplink DPCCH, and there is no alternative way to transmit the TPC, FBI and pilot symbols over the other uplink channels at the duration where transmission of the above channel is discontinued.

Now, a description will be made of a transmission signal structure of the base station and the mobile station according to an embodiment of the present invention.

Figure 6A:
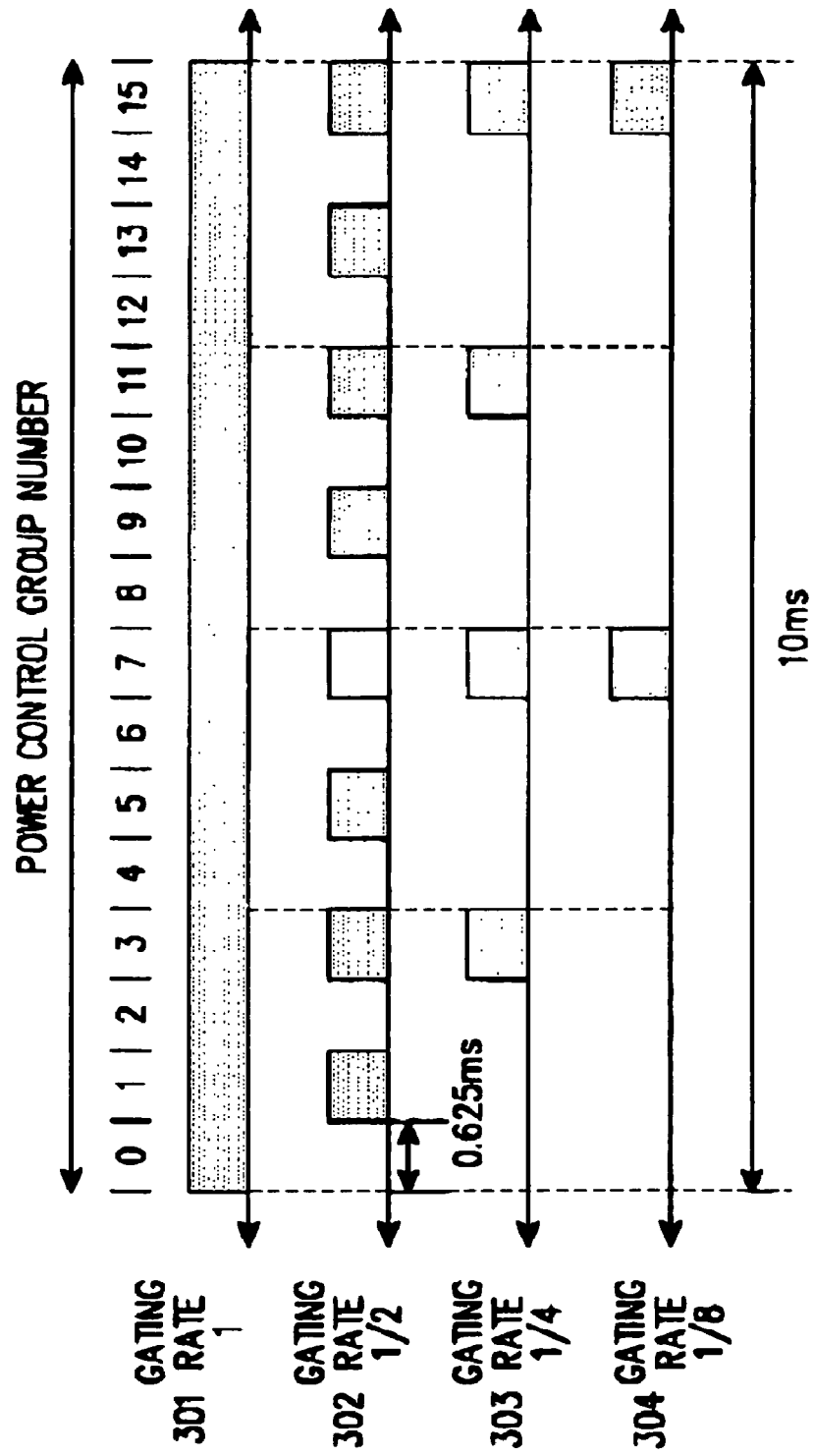
FIG. 6A is a diagram illustrating a method for transmitting a signal according to a regular or gated transmission pattern for an uplink DPCCH in a control-only substate of the invention.

FIG. 6A shows a method for transmitting a signal according to a regular or gated transmission pattern for the uplink DPCCH when there is no DPDCH data to transmit for a predetermined period of time, according to an embodiment of the present invention. In FIG. 6A, reference numerals 301, 302, 303 and 304 show different gating rates according to a ratio of a duty cycle (hereinafter, referred to as DC). Reference numeral 301 shows a conventional method for transmitting the uplink DPCCH without gating (DC=1, i.e., normal transmission), and reference numeral 302 shows a method for regularly transmitting every other power control group (or time slot), when DC=½ (only ½ of the whole power control groups in one frame are transmitted). Reference numeral 303 shows a method for regularly transmitting every fourth power control groups (3rd, 7th, 11th and 15th power control groups), when DC=¼ (only ¼ of the whole power control groups in one frame are transmitted). Reference numeral 304 shows a method for regularly transmitting every eighth power control groups (7th and 15th power control groups), when DC=⅛ (only ⅛ of the whole power control groups in one frame are transmitted). In the embodiment of FIG. 6A, when DC=½ and ¼, although the gated transmission controller 241 of the mobile station regularly gates the power control groups of the uplink DPCCH, it is also possible to gate arbitrary power control groups out of the whole power control groups according to the corresponding DC. That is, when DC=½, it is also possible to continuously gate arbitrary adjacent power control groups according to an irregular pattern, rather than to regularly transmit every other power control group. Further, when DC=½, it is also possible to continuously transmit half of the whole power control groups at the second half (8th to 15th power control groups) of the frame. When DC=¼, it is also possible to continuously transmit ¼ of the whole power control groups beginning at a ¾ point of the frame (i.e., 12th to 15th power control groups). When DC=⅛, it is also possible to continuously transmit ⅛ of the whole power control groups beginning at a ⅞ point of the frame (i.e., 14th to 15th power control groups).

The gating rate transition method can be divided into several methods as stated below, and is determined according to system setup. In one method, a direct state transition occurs from DC=1/1 to DC=½, from DC=1/1 to DC=¼, or from DC=1/1 to DC=⅛ according to a set timer value or a transition command message from the base station. In another method, a sequential state transition occurs from DC=1/1 to DC=½, from DC=½ to DC=¼, or from DC=¼ to ⅛. Selection of the DC value can be determined in consideration of the capacity of the corresponding mobile station or the quality of the channel environment.

Figure 6B:
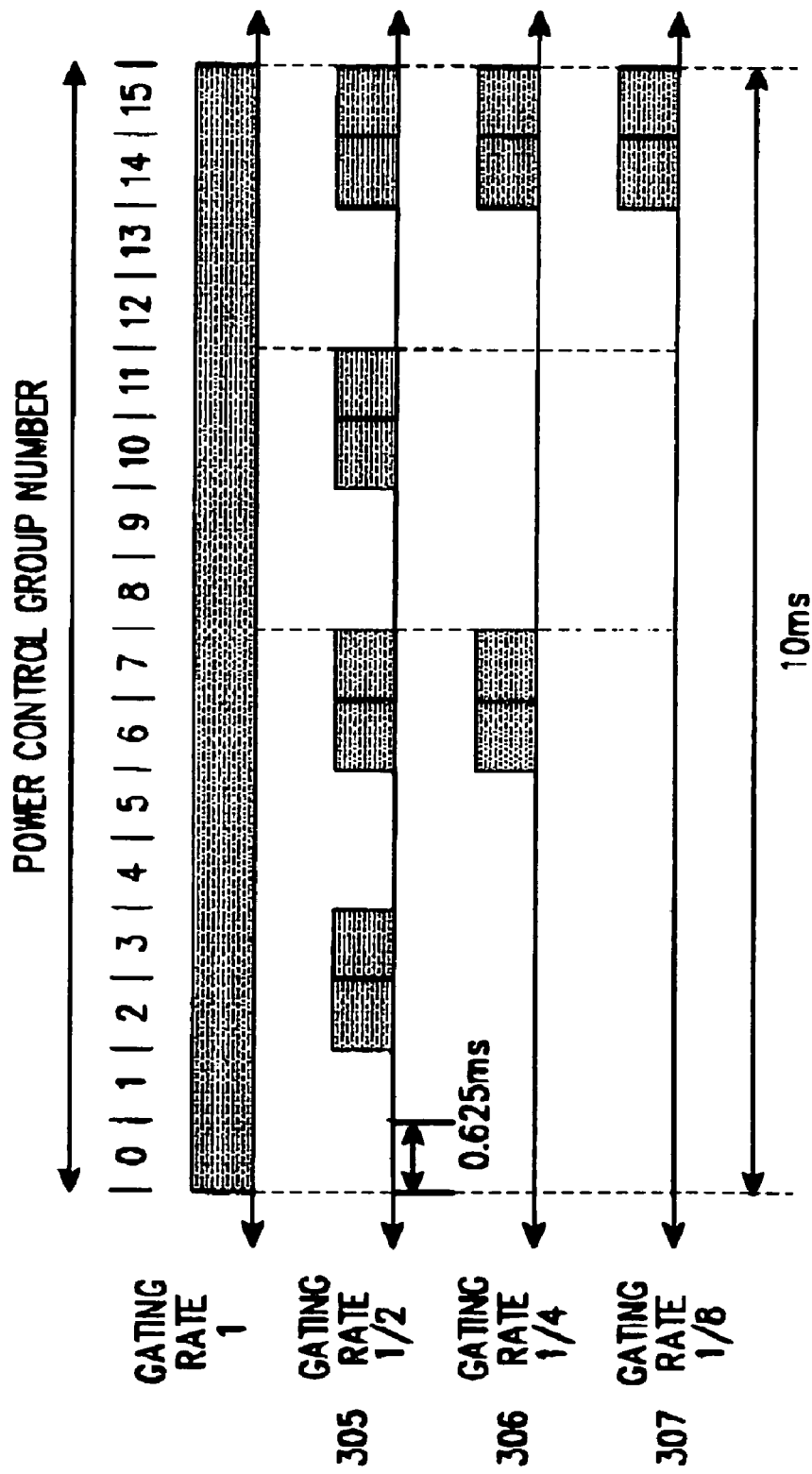
FIG. 6B is a diagram illustrating another method for transmitting a signal according to a regular or gated transmission pattern for an uplink DPCCH in a control-only substate of the invention.

FIG. 6B shows a method for transmitting a signal according to a regular or gated transmission pattern for the uplink DPCCH when there is no DPDCH data to transmit for a predetermined time, according to another embodiment of the present invention. In FIG. 6B, reference numerals 305, 306 and 307 show different gating rates according to a ratio of a duty cycle DC. Reference numeral 305 shows a method for transmitting two consecutive power control groups at regular locations ($2^{nd}$–$3^{rd}$, $6^{th}$–$7^{th}$, $10^{th}$–$11^{th}$ and $14^{th}$–$15^{th}$ power control groups), when DC=½ (only ½ of the whole power control groups in one frame are transmitted). Reference numeral 306 shows a method for transmitting two consecutive power control groups at regular locations ($6^{th}$–$7^{th}$ and $14^{th}$–$15^{th}$ power control groups), when DC=¼ (only ¼ of the whole power control groups in one frame are transmitted). Reference numeral 307 shows a method for transmitting two consecutive power control groups at regular locations ($14^{th}$–$15^{th}$ power control groups), when DC=⅛ (only ⅛ of the whole power control groups in one frame are transmitted). In the embodiment of FIG. 6B, when DC=½ and ¼, although the gated transmission controller 241 of the mobile station regularly gates the power control groups of the uplink DPCCH, it is also possible to gate arbitrary power control groups out of the whole power control groups according to the corresponding DC. That is, when DC=½, it is also possible to continuously gate 4 consecutive power control groups (e.g., $2^{nd}$–$5^{th}$ power control groups) according to an irregular pattern, rather than to regularly transmit every other 2 consecutive power control groups.

The above gating rate transition method can be divided into several methods as stated below, and is determined according to system setup. In one method, a direct state transition occurs from DC=1/1 (full rate) to DC=½, from DC=1/1 to DC=¼, or from DC=1/1 to DC=⅛ according to a set timer value or a transition command message from the base station. In another method, a sequential state transition occurs from DC=1/1 to DC=½, from DC=½ to DC=¼, or from DC=¼ to ⅛. Selection of the DC value can be determined in consideration of the capacity of the corresponding mobile station or the quality of the channel environment.

Figure 7A:
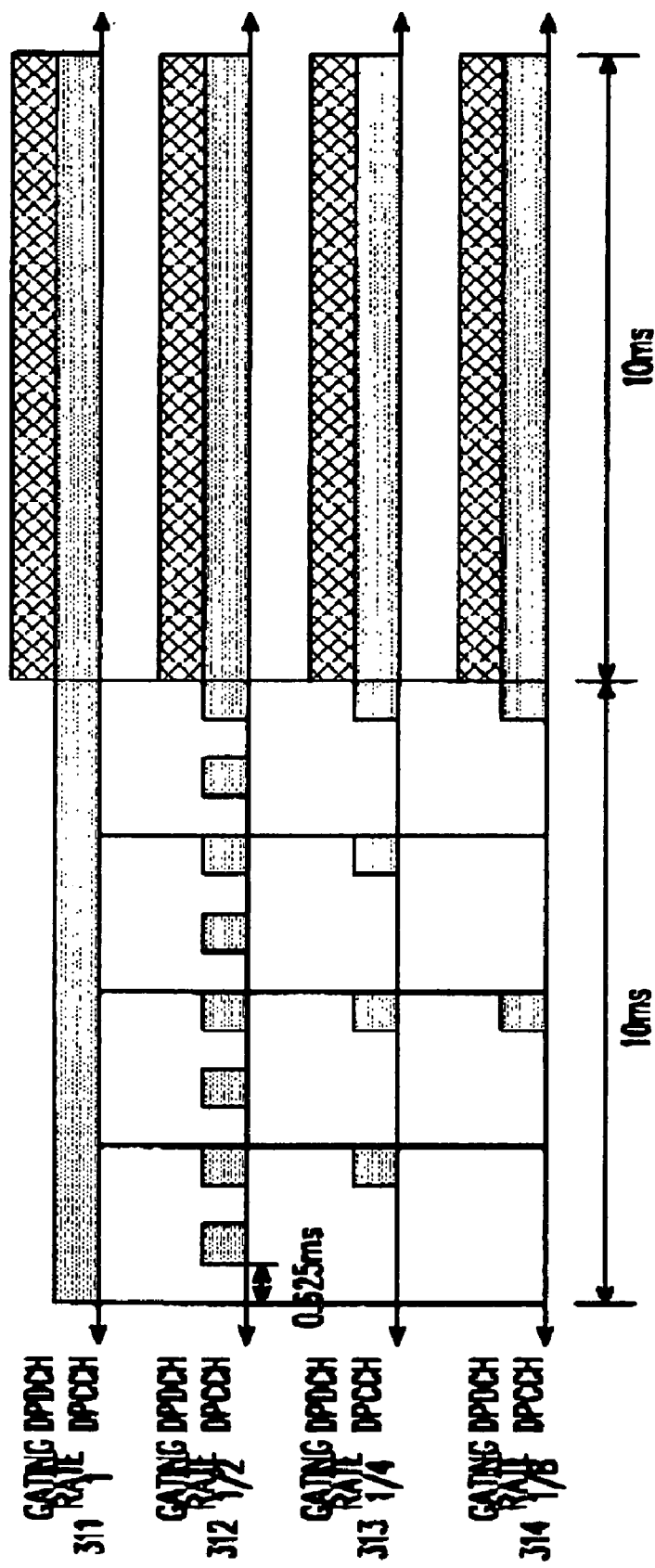
FIG. 7A is a diagram illustrating a method for transmitting a signal when an uplink DPDCH message is generated while an uplink DPCCH is intermittently transmitted in a control-only substate of the invention.

FIGS. 7A and 7B show the uplink DPCCH for the case where a transition message is transmitted over the uplink DPDCH when a dedicated MAC (Medium Access Control) logical channel is generated when there is no DPDCH data for a predetermined time as in FIGS. 6A and 6B. Reference numeral 311 of FIG. 7A shows a case where an uplink DPDCH message is generated while the uplink DPCCH does not undergo gated transmission (i.e., while the uplink DPCCH is continuously transmitted (DC=1/1)). Reference numeral 312 shows a case where the uplink DPDCH message is generated while the uplink DPCCH undergoes DC=½ gated transmission. Reference numeral 313 shows a case where the uplink DPDCH message is generated while the uplink DPCCH undergoes DC=¼ gated transmission. Reference numeral 314 shows a case where the uplink DPDCH message is generated while the uplink DPCCH undergoes DC=⅛ gated transmission. The power control groups indicated by reference numerals 312, 313 and 314 are transmitted according to the gated transmission pattern for the first frame, and the power control groups in the above period are transmitted at DC=1 when the uplink DPDCH is transmitted in the second frame. In the power control groups for normal transmission, the TPC bits for downlink power control can be omitted and the pilot duration (or period) can be extended to a power control group length. Beginning at the power control groups succeeding after transmitting the uplink DPDCH message by normal transmission of the power control groups, it is possible to transmit the uplink DPCCH without gating, or it is possible to gate transmission of the uplink DPCCH according to the original DC value until a state transition message is received from the base station. That is, when the uplink DPDCH message is transmitted for DC=½ gated transmission, it is possible to perform normal transmission on the power control group of the above duration, thereafter perform DC=½ gated transmission again, and then perform DC=1 gated transmission, i.e., normal transmission when there exists DPDCH user data.

Like the uplink DPCCH, even in the downlink, when a downlink DPDCH message is generated during gated transmission for the DPCCH, the power control groups, which were transmitted according to the gated transmission pattern, undergo normal transmission to transmit the downlink DPDCH message. In the power control groups for normal transmission, the TPC bits for downlink power control can be omitted and the pilot duration can be extended to a power control group length. Beginning at the power control groups succeeding after transmitting the downlink DPDCH message by normal transmission of the power control groups, it is possible to transmit the downlink DPCCH without gating, or it is possible to gate transmission of the downlink DPCCH according to the original DC value until a state transition request message is received from the mobile station. That is, when the downlink DPDCH message is transmitted for DC=½ gated transmission, it is possible to perform normal transmission on the power control group of the above duration, thereafter perform DC=½ gated transmission again, and then perform DC=1 gated transmission, i.e., normal transmission when DPDCH user data is transmitted.

Reference numeral 315 of FIG. 7B shows a case where an uplink DPDCH message is generated while the uplink DPCCH undergoes DC=½ gated transmission. Reference numeral 316 shows a case where the uplink DPDCH message is generated while the uplink DPCCH undergoes DC=¼ gated transmission. Reference numeral 317 shows a case where the uplink DPDCH message is generated while the uplink DPCCH undergoes DC=⅛ gated transmission. The power control groups represented by reference numerals 315, 316 and 317 are transmitted according to the gated transmission patterns, and undergo normal transmission to transmit the uplink DPDCH message. In the power control groups for normal transmission, the TPC bits for downlink power control can be omitted and the pilot duration (or period) can be extended to a power control group length. Beginning at the power control groups succeeding after transmitting the uplink DPDCH message by normal transmission of the power control groups, it is possible to transmit the uplink DPCCH without gating, or it is possible to gate transmission of the uplink DPCCH according to the original DC value until a state transition message is received from the base station. That is, when the uplink DPDCH message is transmitted for DC=½ gated transmission, it is possible to perform normal transmission on the power control group of the above duration, thereafter perform DC=½ gated transmission again, and then perform DC=1 gated transmission, i.e., normal transmission when DPDCH user data is transmitted.

It is also possible to simultaneously gate transmission of both the uplink DPCCH and the downlink DPCCH according to the same gating pattern. Beginning at the power control groups succeeding after transmitting the downlink DPDCH message by normal transmission of the power control groups, generated while gating transmission of the downlink DPCCH, it is possible to transmit the downlink DPCCH without gating, or it is possible to gate transmission of the downlink DPCCH according to the original DC value until a state transition request message is received from the mobile station. That is, when the downlink DPDCH message is transmitted for DC=½ gated transmission, it is possible to perform normal transmission on the power control group of the above duration, perform DC=½ gated transmission again, thereafter perform DC=1 gated transmission when transitioning to the user data active substate upon receipt of a state transition request message from the mobile station, and then stop gated transmission when DPDCH user data is transmitted.

Figure 8A:
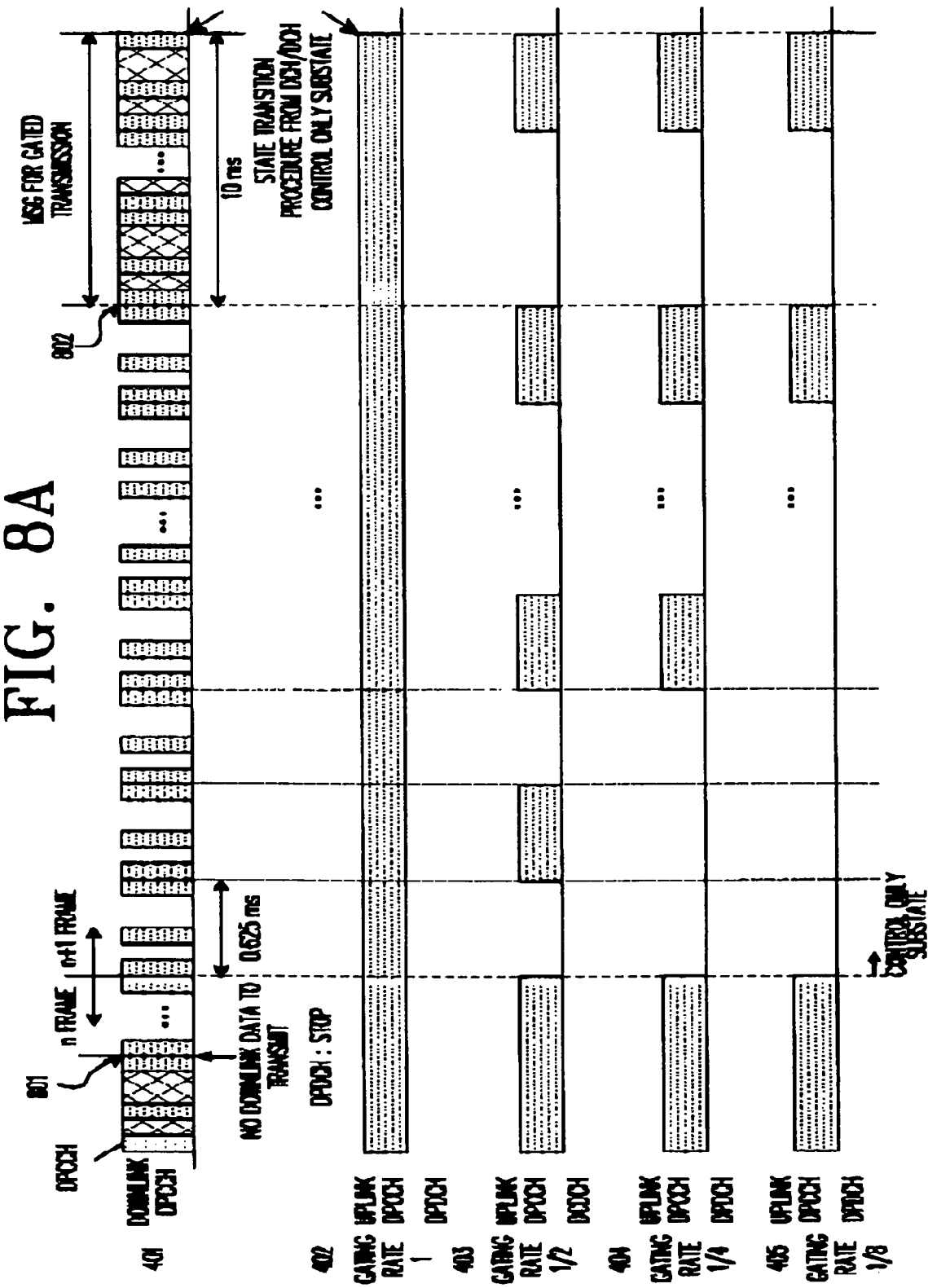
FIG. 8A is a diagram illustrating a method for transmitting downlink and uplink signals when transmission of a downlink DPDCH is discontinued.

FIG. 8A shows a method for transmitting downlink and uplink signals when transmission of a downlink DPDCH is discontinued. When transmission of the downlink DPDCH is discontinued as shown by reference numeral 801 in the user data active substate where there exists no uplink DPDCH, the base station and the mobile station start gated transmission if a set timer value expires or a downlink DPDCH message for state transition is generated. Although FIG. 8A shows an embodiment where a message for starting gated transmission is generated by the base station, it is also possible for the mobile station to send a gating request message to the base station when there is no downlink and uplink DPDCH. While transmitting the downlink DPCCH in FIG. 8A, it is also possible to transmit all the TFCI, TPC and pilot symbols without gating. Since the TPC bits include meaningless TPC values determined by measuring power strength of the pilot symbols of the gated power control groups within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous power control group. Alternatively, while transmitting the downlink DPCCH in FIG. 8A, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The power control group, in which the TPC bits in the downlink DPCCH are gated, refers to the TPC bits generated by measuring the pilot symbols corresponding to the gated power control group in the DPCCH transmitted from the mobile station.

Reference numeral 802 shows a situation where a message generated for gated transmission is transmitted to the mobile station over the downlink DPDCH. In this case, the mobile station, which has been gating transmission of the uplink DPCCH, can stop gated transmission upon receipt of a gated transmission stop message when the uplink DPDCH data is transmitted, and continue transmission at DC=1. Alternatively, the mobile station, which has been gating transmission of the uplink DPCCH, can continue gated transmission even after receipt of the gated transmission stop message, stop gated transmission at the time indicated by the gated transmission stop message, and then perform normal transmission (DC=1).

Figure 8B:
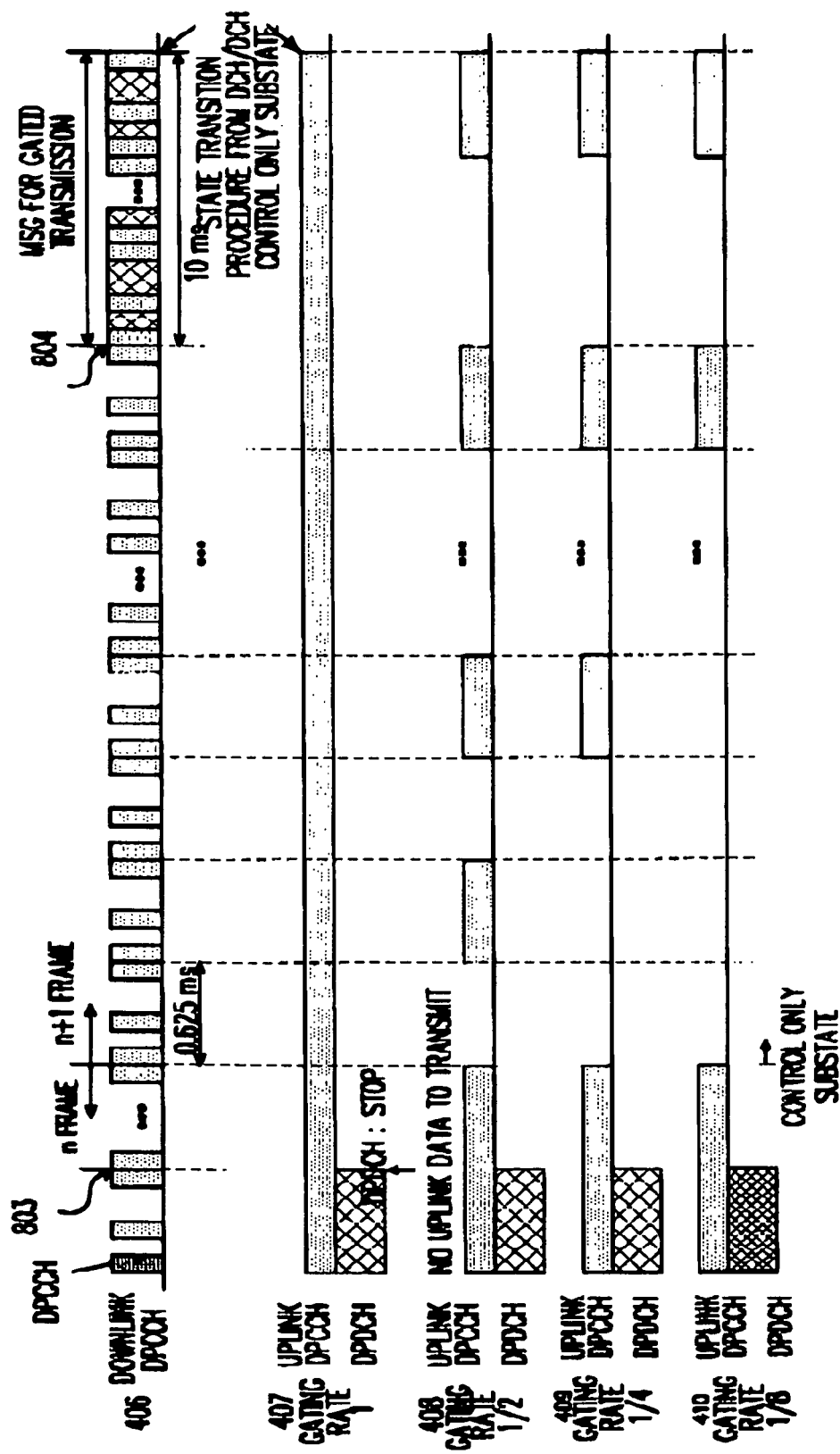
FIG. 8B is a diagram illustrating a method for transmitting downlink and uplink signals when transmission of an uplink DPDCH is discontinued.

FIG. 8B shows a method for transmitting downlink and uplink signals when transmission of an uplink DPDCH is discontinued. When transmission of the uplink DPDCH is discontinued as shown by reference numeral 803 in the user data active substate where there exists no downlink DPDCH, the base station and the mobile station perform gated transmission at a time point appointed (or scheduled) between them when a set timer value expires or after exchanging a state transition message. Although FIG. 8B shows an embodiment where the message for gated transmission is generated in the downlink DPDCH, the gated transmission message can also be generated in the uplink DPDCH of the mobile station. While transmitting the downlink DPCCH in FIG. 8B, it is also possible to transmit all the TFCI, TPC and pilot symbols without gating. Since the TPC bits include meaningless TPC values determined by measuring power strength of the pilot symbols of the gated power control groups within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous power control group. Alternatively, while transmitting the downlink DPCCH in FIG. 8B, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The power control group, in which the TPC bits in the downlink DPCCH are gated, refers to the TPC bits generated by measuring the pilot symbols corresponding to the gated power control group in the DPCCH transmitted from the mobile station.

Reference numeral 804 shows a situation where a gated transmission message generated by the base station is transmitted to the mobile station over the downlink DPDCH. In this case, the mobile station, which has been gating transmission of the uplink DPCCH, can stop gated transmission upon receipt of the gated transmission stop message and perform normal transmission (DC=1). Alternatively, the mobile station, which has been gating transmission of the uplink DPCCH, can continue gated transmission even after receipt of the gated transmission stop message, stop gated transmission at the time point indicated by the gated transmission stop message, and then perform normal transmission (DC=1).

Figure 8C:
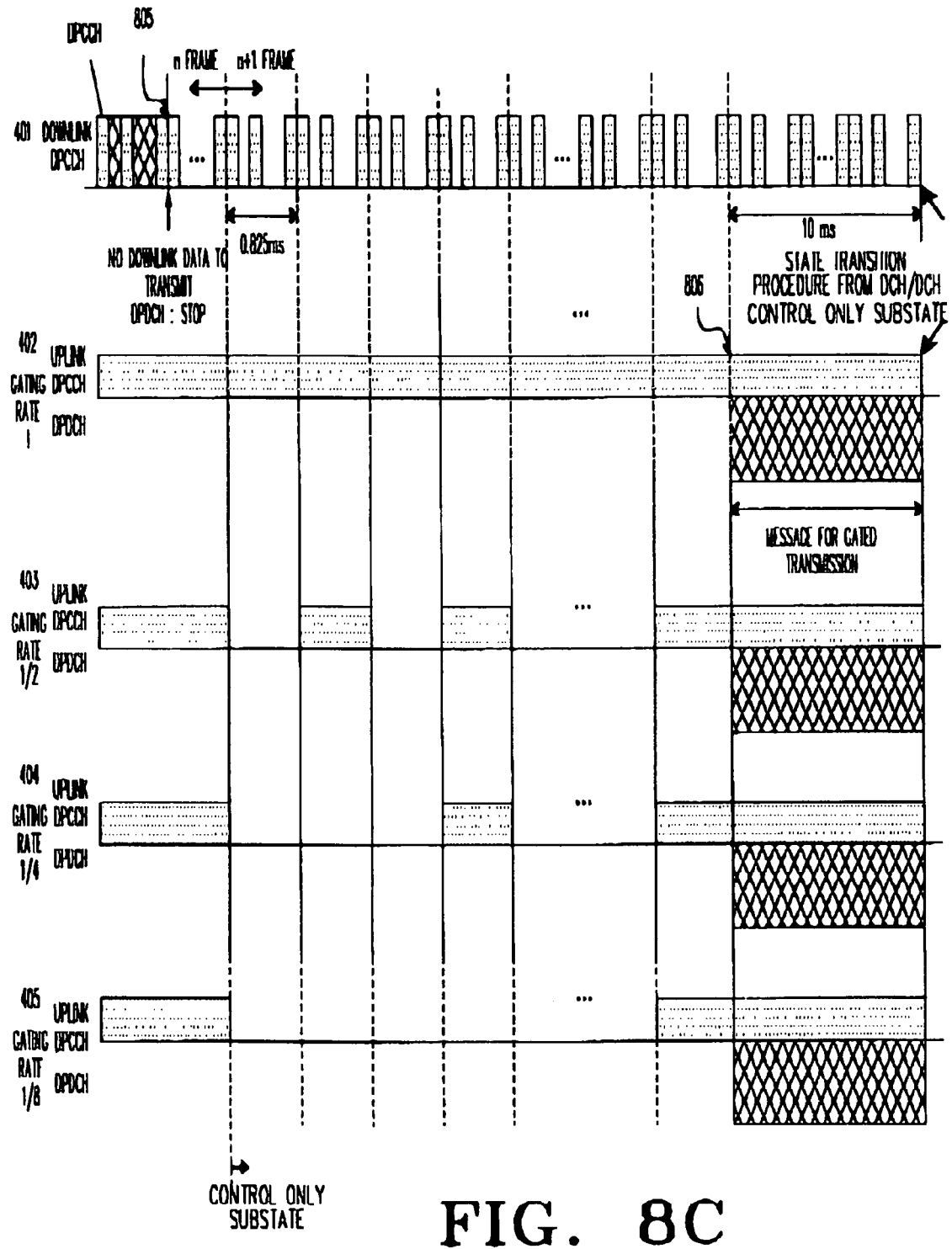
FIG. 8C is a diagram illustrating another method for transmitting downlink and uplink signals when transmission of the downlink DPDCH is discontinued.

FIG. 8C shows a method for transmitting downlink and uplink signals when transmission of a downlink DPDCH is discontinued. When transmission of the downlink DPDCH is discontinued as shown by reference numeral 805 in the user data active substate where there exists no uplink DPDCH, the base station and the mobile station start gated transmission if a set timer value expires or a downlink DPDCH message for starting gated transmission is generated. Although FIG. 8C shows an embodiment where the message for gated transmission is generated by the base station, it is also possible for the mobile station to send a gated transmission request message to the base station when there is no downlink and uplink DPDCH. While transmitting the downlink DPCCH in FIG. 8C, it is also possible to transmit all the TFCI, TPC and pilot symbols without gating. Since the TPC bits include meaningless TPC values determined by measuring power strength of the pilot symbols of the gated power control groups within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous power control group. Alternatively, while transmitting the downlink DPCCH in FIG. 8C, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The power control group, in which the TPC bits in the downlink DPCCH are gated, refers to the TPC bits generated by measuring the pilot symbols corresponding to the gated power control group in the DPCCH transmitted from the mobile station.

Reference numeral 806 shows a situation where a gated transmission message generated by the mobile station is transmitted to the base station over the uplink DPDCH. In this case, the mobile station, which has been gating transmission of the uplink DPCCH, can stop gated transmission after transmission of the gated transmission message over the uplink DPDCH and then perform normal transmission (DC=1). Alternatively, the mobile station, which has been gating transmission of the uplink DPCCH, can continue gated transmission even after receipt of the gated transmission stop message, stop gated transmission at the time point indicated by the gated transmission stop message, and then perform normal transmission (DC=1).

Figure 8D:
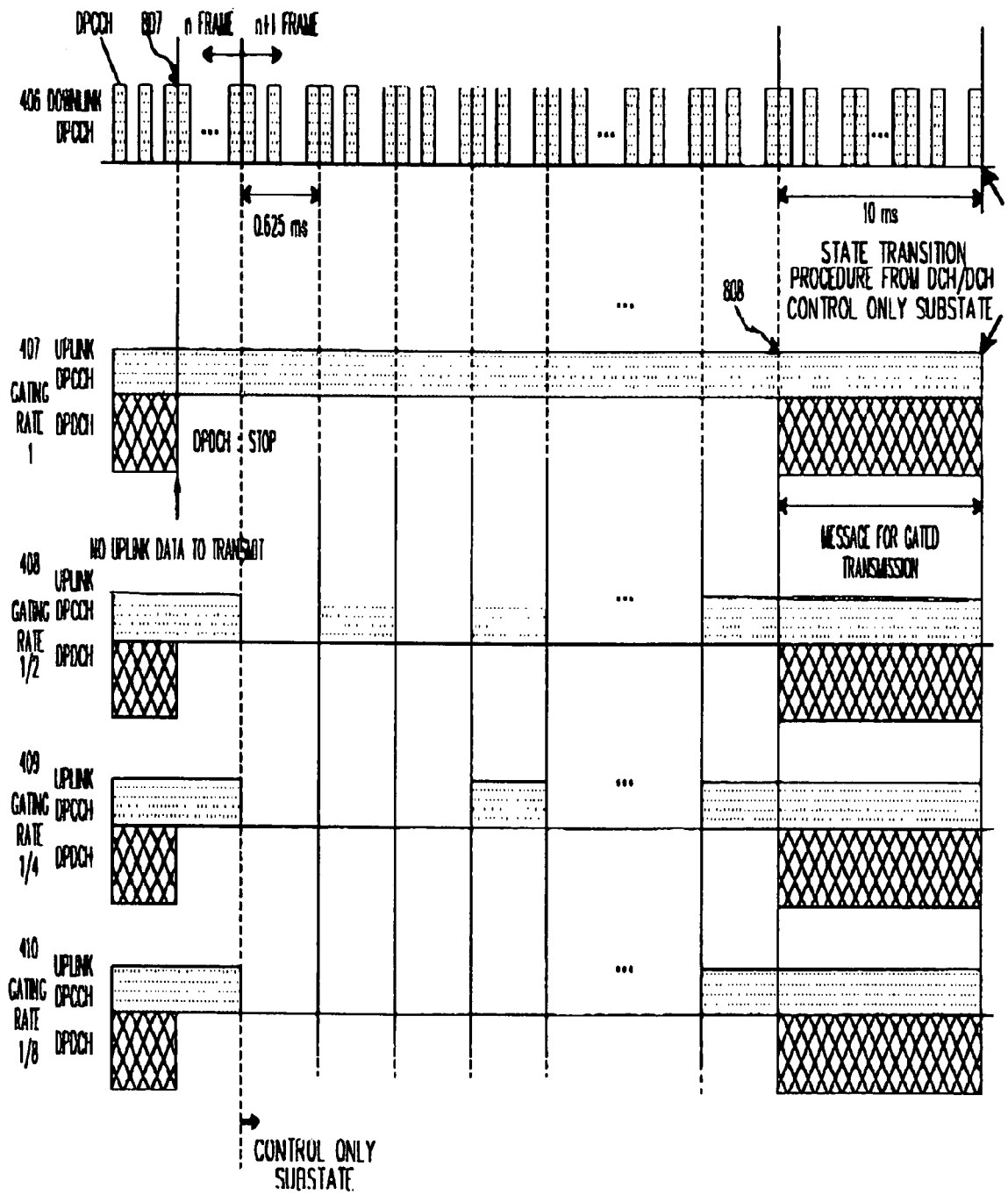
FIG. 8D is a diagram illustrating another method for transmitting downlink and uplink signals when transmission of the uplink DPDCH is discontinued.

FIG. 8D shows a method for transmitting downlink and uplink signals when transmission of an uplink DPDCH is discontinued. When transmission of the uplink DPDCH is discontinued as shown by reference numeral 807 in the user data active substate where there exists no downlink DPDCH for a predetermined period of time, the base station and the mobile station can start gated transmission at a time point appointed (or scheduled) between them when a set timer value expires or after exchanging a gated transmission message. Although FIG. 8D shows an embodiment where the message for gated transmission is generated in the downlink DPDCH, the gated transmission message can also be generated in the uplink DPDCH of the mobile station. While transmitting the downlink DPCCH in FIG. 8D, it is also possible to transmit all the TFCI, TPC and pilot symbols without gating. Since the TPC bits include meaningless TPC values determined by measuring power strength of the pilot symbols of the gated power control groups within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous power control group. Alternatively, while transmitting the downlink DPCCH in FIG. 8D, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The power control group, in which the TPC bits in the downlink DPCCH are gated, refers to the TPC bits generated by measuring the pilot symbols corresponding to the gated power control group in the DPCCH transmitted from the mobile station.

Reference numeral 808 shows a situation where a gated transmission message generated by the mobile station is transmitted to the base station over the uplink DPDCH. In this case, the mobile station, which has been gating transmission of the uplink DPCCH, can stop gated transmission after transmission of the gated transmission message over the uplink DPDCH and then perform normal transmission (DC=1). Alternatively, the mobile station, which has been gating transmission of the uplink DPCCH, can continue gated transmission even after transmission of the gated transmission stop message, stop gated transmission at the time point indicated by the gated transmission stop message, and then perform normal transmission (DC=1).

Figure 9A:
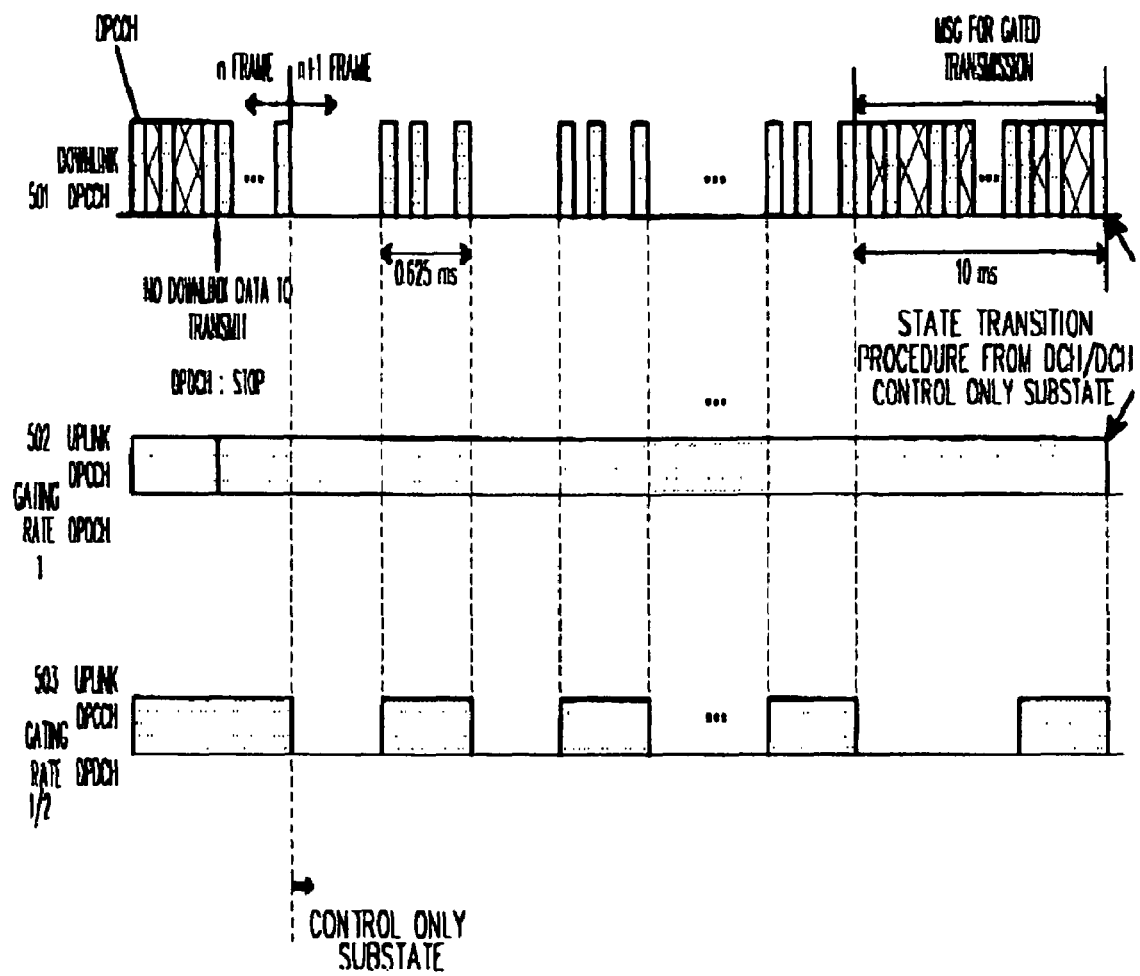
FIG. 9A is a diagram illustrating a method for transmitting downlink and uplink signals when transmission of a downlink DPDCH is discontinued (gated transmission for the downlink DPCCH)

FIG. 9A shows a method for transmitting downlink and uplink signals when transmission of a downlink DPDCH is discontinued. When transmission of the downlink DPDCH is discontinued, the base station and the mobile station can start gated transmission at a time point appointed between them if a set timer value expires or after exchanging a gated transmission message. FIG. 9A shows a case where a gating pattern for the downlink DPCCH is identical to a gating pattern for the uplink DPCCH. Although FIG. 9A shows an embodiment where the gated transmission message is generated through the downlink DPDCH, the gated transmission message can also be generated through the uplink DPDCH of the mobile station.

Figure 9B:
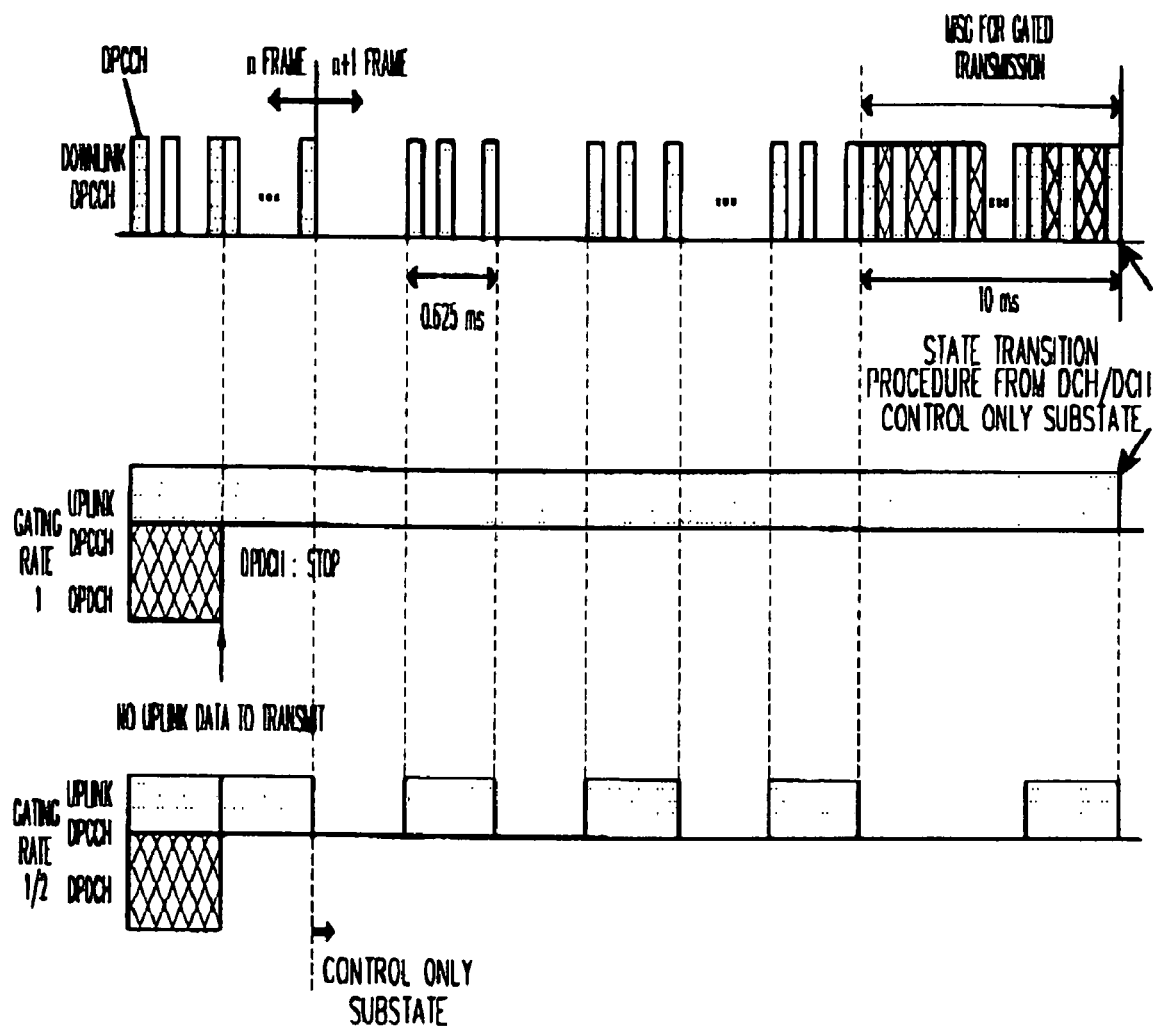
FIG. 9B is a diagram illustrating a method for transmitting downlink and uplink signals when transmission of an uplink DPDCH is discontinued (gated transmission for downlink DPCCH)

FIG. 9B shows a method for transmitting downlink and uplink signals when transmission of an uplink DPDCH is discontinued. When transmission of the uplink DPDCH is discontinued, the base station and the mobile station can start gated transmission at a time point appointed between them if a set timer value expires or after exchanging a gated transmission message. FIG. 9B shows a case where a gating pattern for the downlink DPCCH is identical to a gating pattern for the uplink DPCCH. Although FIG. 9B shows an embodiment where the gated transmission message is generated through the downlink DPDCH, the gated transmission message can also be generated through the uplink DPDCH of the mobile station.

Figure 10A:
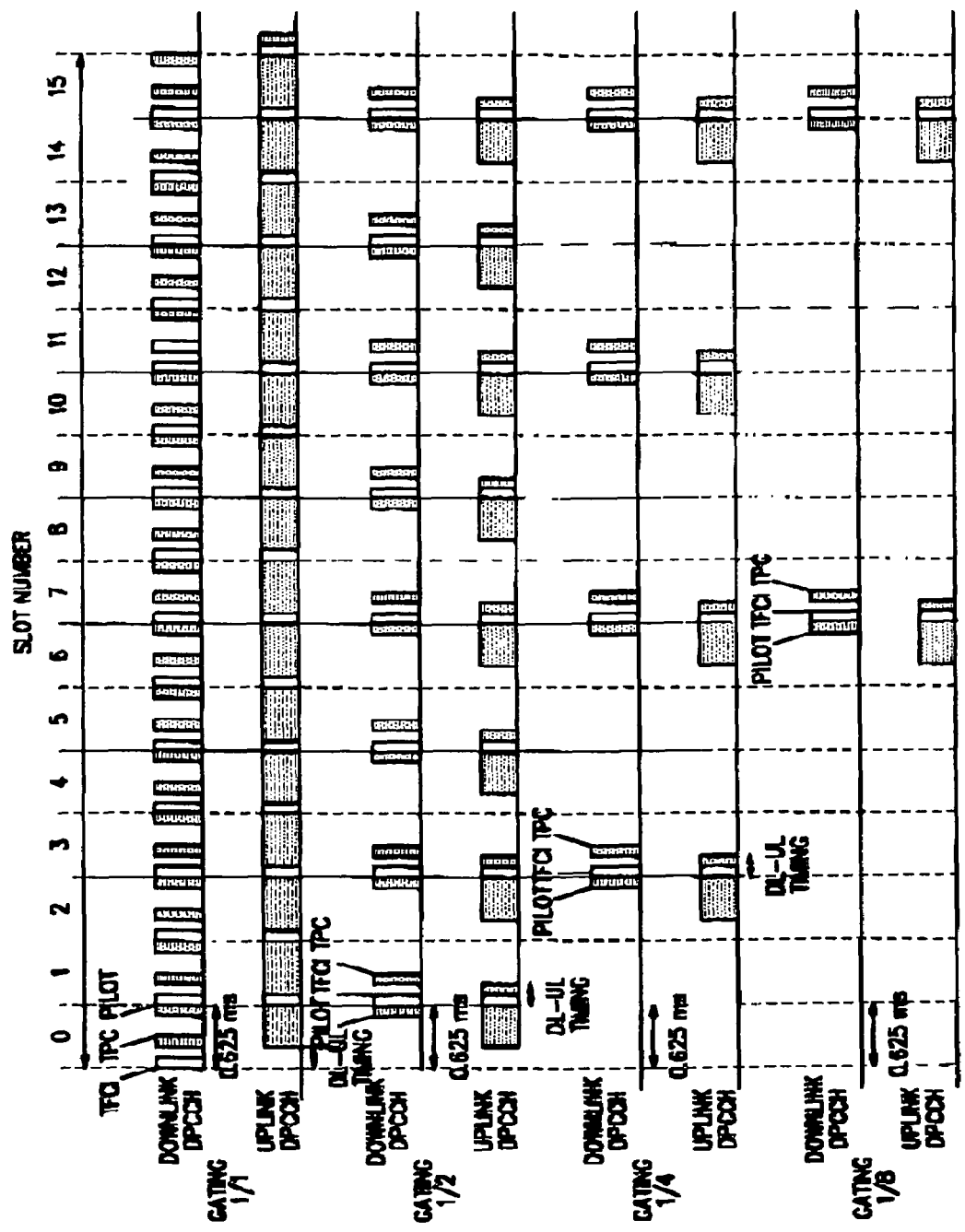
FIG. 10A is a diagram illustrating gated transmission for downlink and uplink DPCCHs according to a first embodiment of the present invention.
Figure 10B:
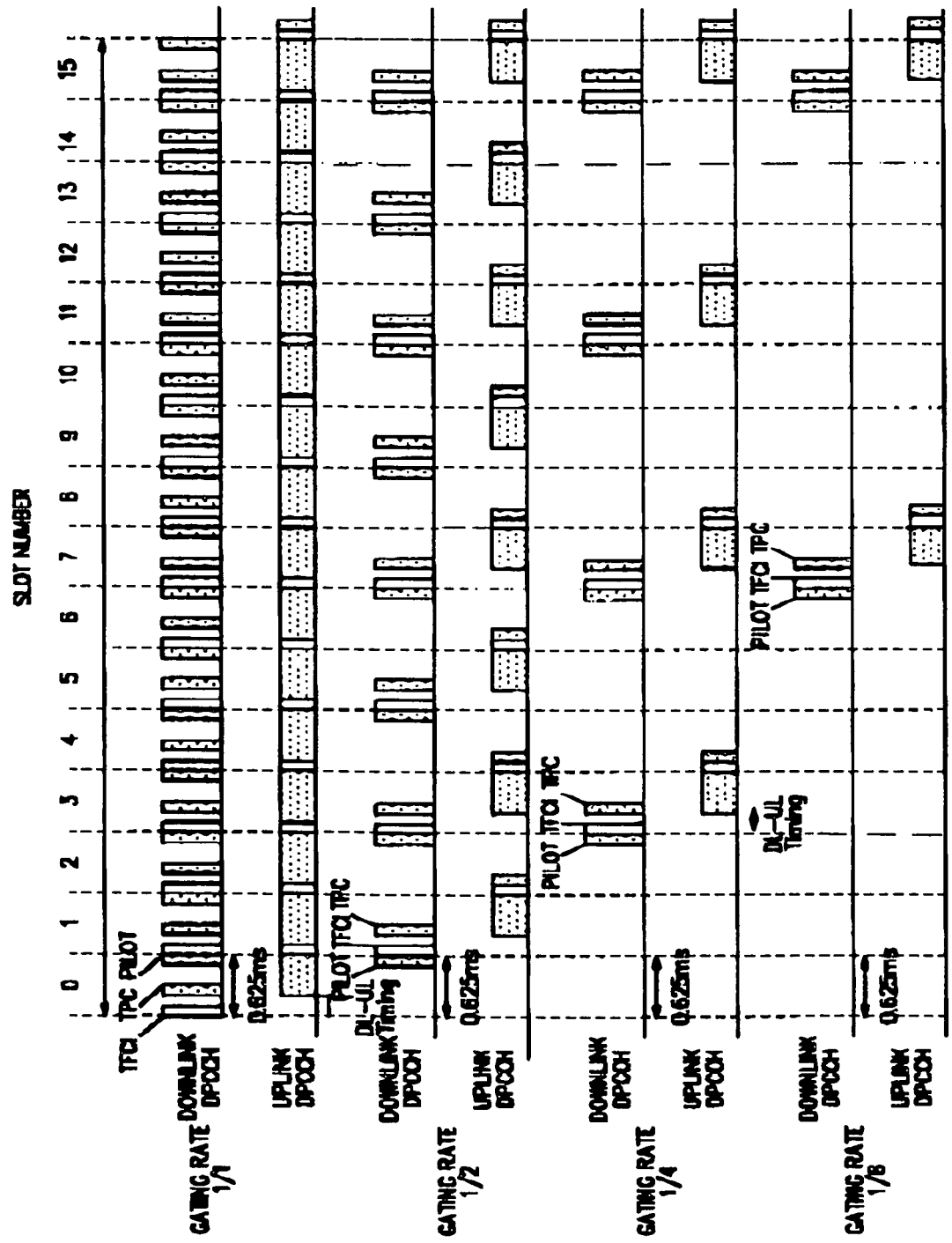
FIG. 10B is a diagram illustrating gated transmission for downlink and uplink DPCCHs according to a second embodiment of the present invention.

In the foregoing drawings and descriptions, the downlink and uplink frames have the same frame start point. However, in the UTRA system, the frame start point of the uplink is artificially delayed by 250 μsec as compared with the frame start point of the downlink. This is to make power control time delay become one slot (=0.625 ms) in consideration of propagation delay of the transmission signal when a cell radius is smaller than 30 Km. Therefore, in consideration of the artificial time delay of the downlink and uplink frame start time, the methods for transmitting the DPCCH signal according to gated transmission can be shown by FIGS. 11A to 11E. FIGS. 10A and 10B show structures of the base station controller and the mobile station controller, which enable such gated transmission, respectively.

FIG. 10A shows gated transmission for the downlink and uplink DPCCHs according to a first embodiment of the present invention. As shown in FIG. 10A, a gated transmission unit for the downlink DPCCH may not be a slot unit. That is, with regard to two adjacent slots, a pilot symbol of an nth slot and TFCI and TPC bits of an (n+1)th slot are set as a gated transmission unit for the downlink DPCCH. This is because the pilot symbol is used to estimate a channel by detecting TFCI and TPC. For example, when a gating rate is ½, a pilot symbol of a slot number 0 and TFCI and TPC bits of a slot number 1 are set as a gated transmission unit for the downlink DPCCH. When the gating rate is ¼, a pilot symbol of a slot number 2 and TFCI and TPC bits of a slot number 3 are set as a gated transmission unit for the downlink DPCCH. When the gating rate is ⅛, a pilot symbol of a slot number 6 and TFCI and TPC bits of a slot number 7 are set as a gated transmission unit for the downlink DPCCH. Here, the gated transmission unit for the downlink DPCCH is set to be different from the actual slot unit, since an nth pilot symbol may be required in the receiver to demodulate the (n+1)th TPC according to a demodulation method for the TPC signal.

When a signaling message is generated during such gated transmission, the signaling message is transmitted over the downlink or uplink DPDCH. Therefore, performance of the frame start point is very important. In the invention, as shown in FIG. 10A, TPC for the downlink DPCCH and TPC for the uplink DPCCH are located at a slot number 15 (i.e., $16^{th}$ slot which is the last slot of one frame), so that the first slot of an (n+1)th frame should be power controlled using the TPC bits existing in the last slot of an nth frame. That is, TPC for power controlling the first slot of the next frame is located at the last slot of the present frame.

Meanwhile, in the UTRA system stated above, an offset between the downlink and uplink frame start points is fixed to 250 μsec. However, in gated transmission of the downlink and uplink DPCCHs, the offset value can be changed to an arbitrary value while the base station and the mobile station exchange a parameter for DPCCH gated transmission in the call setup process. The offset value is set to a proper value in consideration of a propagation delay of the base station and the mobile station in the call setup process. That is, when the cell radius is over 30 Km, the offset value can be set to a value larger than the conventional offset value of 250 μsec for DPCCH gated transmission, and the value can be determined through experiments.

FIG. 10B shows gated transmission for the downlink and uplink DPCCHs according to a second embodiment of the present invention. FIG. 10B shows a case where transmission of the downlink DPCCH goes ahead of transmission of the uplink DPCCH during gated transmission, for the gating rates of ½, ¼ and ⅛. The difference (i.e., offset) is represented by "DL-UD timing" for the gating rates of ½, ¼ and ⅛.

Referring to FIG. 10B, with regard to two adjacent slots, a pilot symbol of the nth slot and TFCI and TPC of the (n+1)th slot are set as a gated transmission unit for the downlink DPCCH. For example, for the gating rate ½, a pilot symbol of a slot number 0 and TFCI and TPC of a slot number 1 are set as a gated transmission unit for the downlink DPCCH. For the gating rate ¼, a pilot symbol of a slot number 2 and TFCI and TPC of a slot number 3 are set as a gated transmission unit for the downlink DPCCH. For the gating rate ⅛, a pilot symbol of a slot number 6 and TFCI and TPC of a slot number 7 are set as a gated transmission unit for the downlink DPCCH.

In addition, it is noted that TPC for power controlling the first slot of the next frame is located at the last slot of the present frame. That is, TPC for the downlink DPCCH and TPC for the uplink DPCCH are both located at a slot number 15 (i.e., $16^{th}$ slot).

Figure 10C:
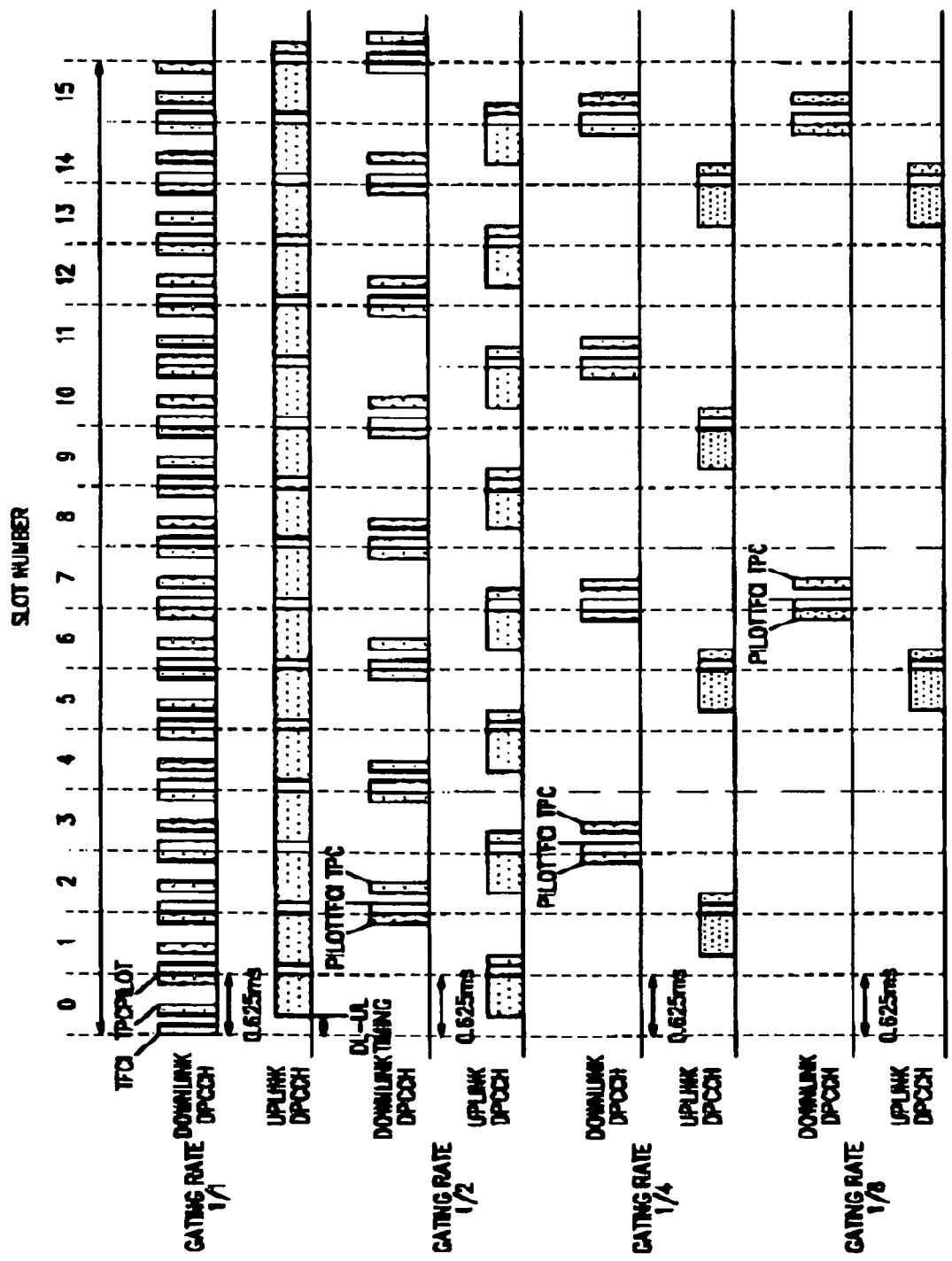
FIG. 10C is a diagram illustrating gated transmission for downlink and uplink DPCCHs according to a third embodiment of the present invention.

FIG. 10C shows gated transmission for the downlink and uplink DPCCHs according to a third embodiment of the present invention. FIG. 10C shows a case where transmission of the uplink DPCCH goes ahead of transmission of the downlink DPCCH during gated transmission, for the gating rates of ½, ¼ and ⅛.

Referring to FIG. 10C, with regard to two adjacent slots, a pilot symbol of the nth slot and TFCI and TPC of the (n+1)th slot are set as a gated transmission unit for the downlink DPCCH. For example, for the gating rate ½, a pilot symbol of a slot number 1 and TFCI and TPC of a slot number 2 are set as a gated transmission unit for the downlink DPCCH. For the gating rate ¼, a pilot symbol of a slot number 2 and TFCI and TPC of a slot number 3 are set as a gated transmission unit for the downlink DPCCH. For the gating rate ⅛, a pilot symbol of a slot number 6 and TFCI and TPC of a slot number 7 are set as a gated transmission unit for the downlink DPCCH.

In addition, it is noted that TPC for power controlling the first slot of the next frame is located at the last slot of the present frame. That is, TPC for the downlink DPCCH and TPC for the uplink DPCCH are both located at a slot number 15 (i.e., $16^{th}$ slot).

Figure 10D:
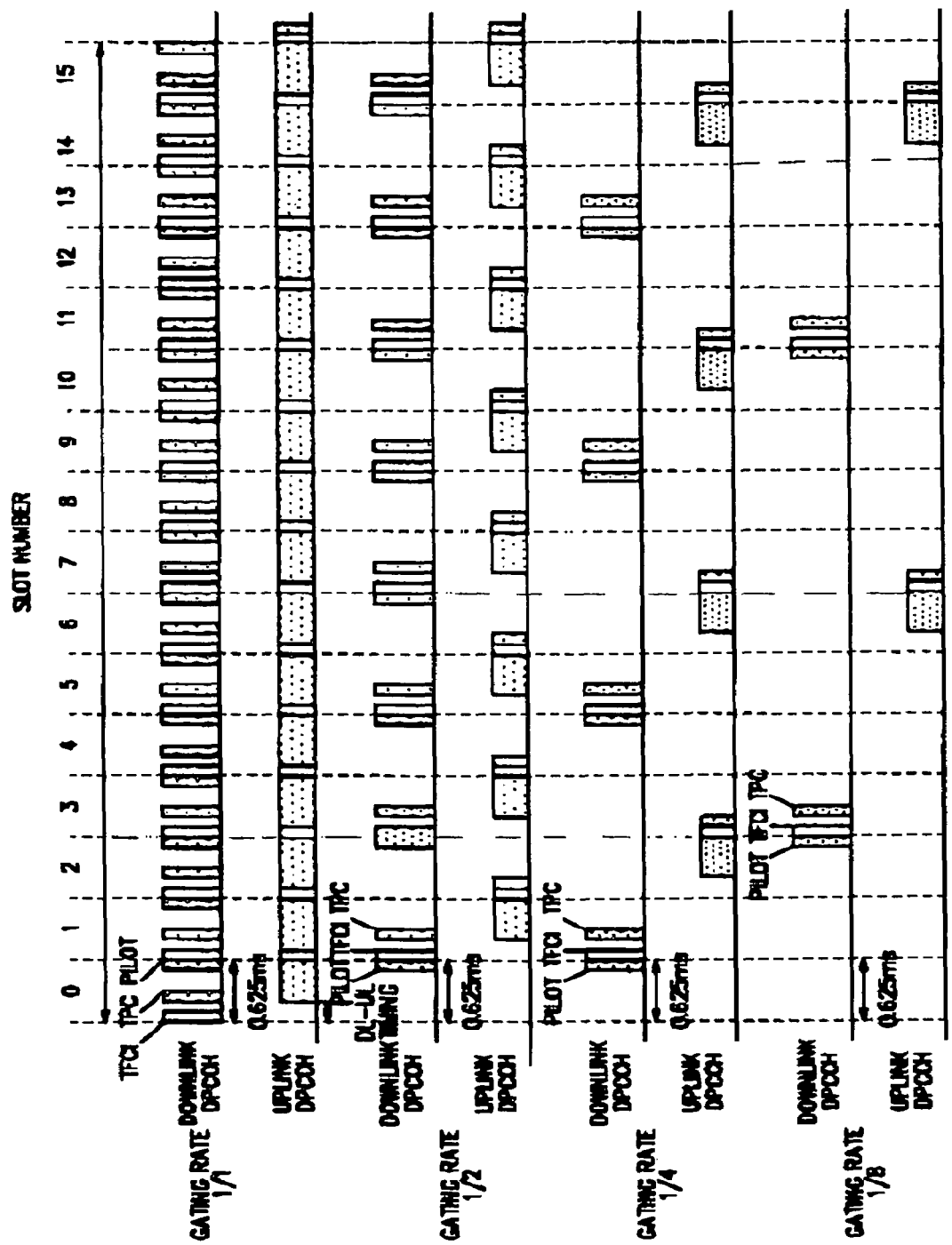
FIG. 10D is a diagram illustrating gated transmission for downlink and uplink DPCCHs according to a fourth embodiment of the present invention.

FIG. 10D shows gated transmission for the downlink and uplink DPCCHs according to a fourth embodiment of the present invention. FIG. 10D shows a case where for the gating rates of ½, ¼ and ⅛, transmission of the downlink DPCCH goes ahead of transmission of the uplink DPCCH during gated transmission, and the downlink and uplink gating patterns are set to the same period.

Referring to FIG. 10D, with regard to two adjacent slots, a pilot symbol of the nth slot and TFCI and TPC of the (n+1)th slot are set as a gated transmission unit for the downlink DPCCH. For example, for the gating rate ½, a pilot symbol of a slot number 0 and TFCI and TPC of a slot number 1 are set as a gated transmission unit for the downlink DPCCH. For the gating rate ¼, a pilot symbol of a slot number 0 and TFCI and TPC of a slot number 1 are set as a gated transmission unit for the downlink DPCCH. For the gating rate ⅛, a pilot symbol of a slot number 2 and TFCI and TPC of a slot number 3 are set as a gated transmission unit for the downlink DPCCH.

In addition, it is noted that TPC for power controlling the first slot of the next frame is located at the last slot of the present frame. That is, TPC for the downlink DPCCH and TPC for the uplink DPCCH are both located at a slot number 15 (i.e., $16^{th}$ slot).

Figure 10E:
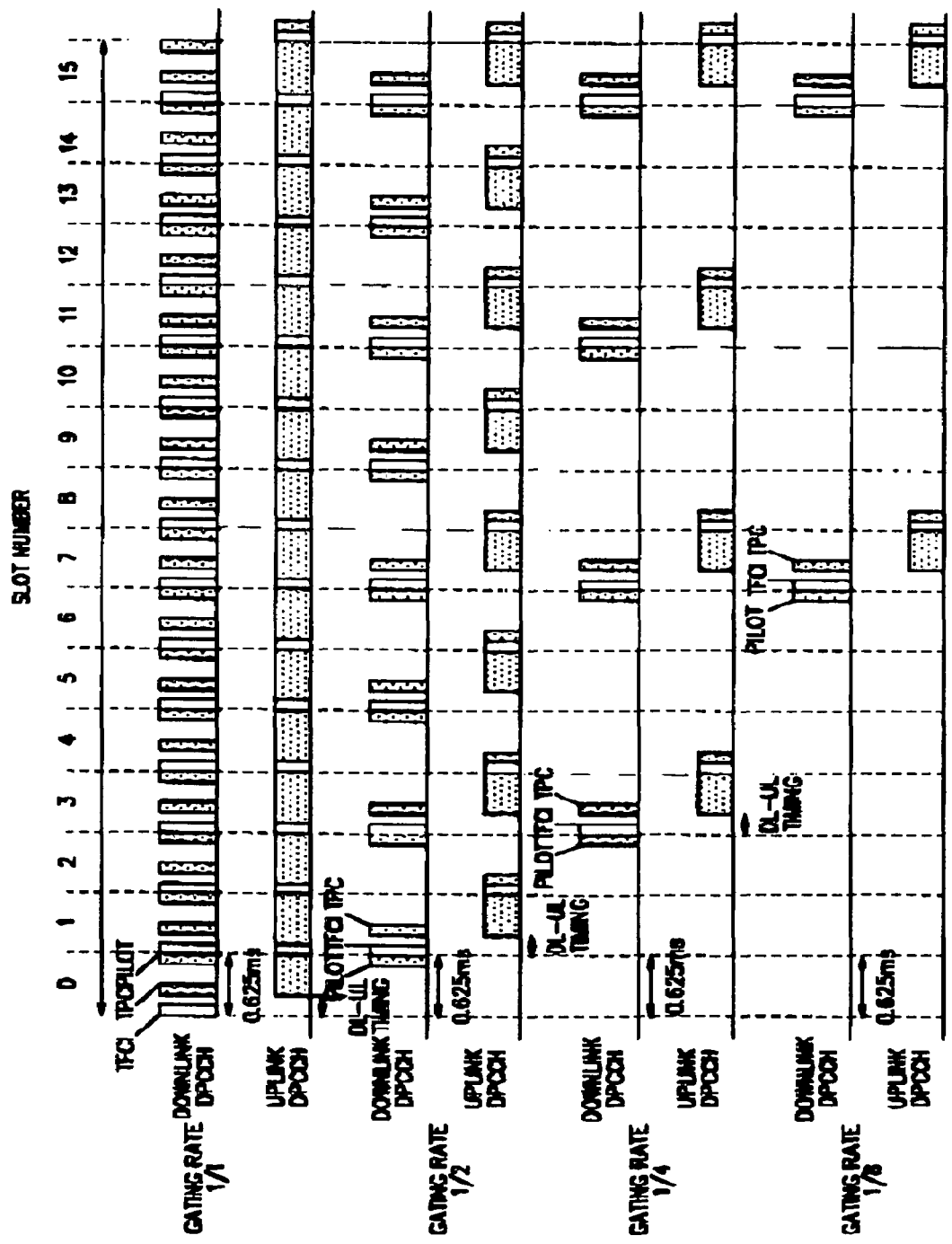
FIG. 10E is a diagram illustrating gated transmission for downlink and uplink DPCCHs according to a fifth embodiment of the present invention.

FIG. 10E shows gated transmission for the downlink and uplink DPCCHs according to a fifth embodiment of the present invention. FIG. 10E shows a case where for the gating rates of ½, ¼ and ⅛, transmission of the uplink DPCCH goes ahead of transmission of the downlink DPCCH during gated transmission, and the downlink and uplink gating patterns are set to the same period.

Referring to FIG. 10E, with regard to two adjacent slots, a pilot symbol of the nth slot and TFCI and TPC of the (n+1)th slot are set as a gated transmission unit for the downlink DPCCH. For example, for the gating rate ½, a pilot symbol of a slot number 1 and TFCI and TPC of a slot number 2 are set as a gated transmission unit for the downlink DPCCH. For the gating rate ¼, a pilot symbol of a slot number 2 and TFCI and TPC of a slot number 3 are set as a gated transmission unit for the downlink DPCCH. For the gating rate ⅛, a pilot symbol of a slot number 6 and TFCI and TPC of a slot number 7 are set as a gated transmission unit for the downlink DPCCH.

In addition, it is noted that TPC for power controlling the first slot of the next frame is located at the last slot of the present frame. That is, TPC for the downlink DPCCH and TPC for the uplink DPCCH are both located at a slot number 15 (i.e., $16^{th}$ slot). FIG. 10E shows that TPC for the downlink DPCCH is not located at the slot number 15 for a ½ gating rate.

Figure 11A:
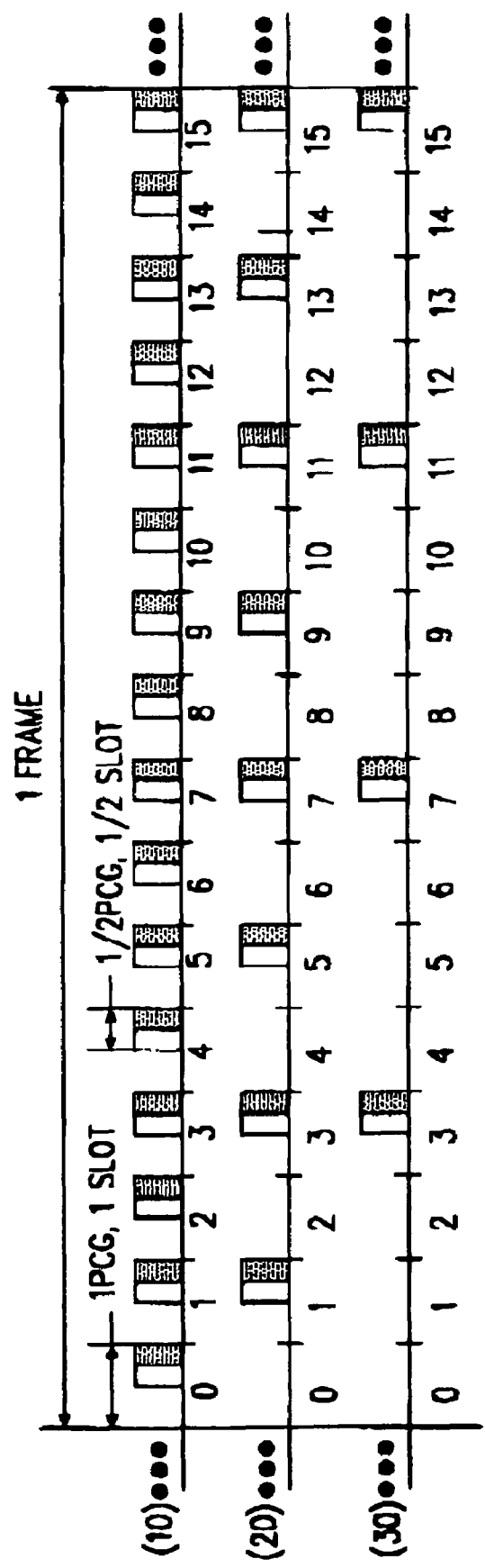
FIG. 11A is a diagram illustrating a method for transmitting a signal when a regular or gated transmission unit of an uplink DPCCH is ½ the power control group in a gating mode according to an embodiment of the present invention.

FIG. 11A shows a method for transmitting a signal according to regular or gated transmission pattern for an uplink DPCCH in a gating mode according to an embodiment of the present invention. In the embodiment, gated transmission can be performed in a unit of a partial power control group (PCG) duration (e.g., ½ PCG) rather than in a unit of one PCG. Thus, the embodiment will have the same operation as described above, except that gated transmission is performed in the unit of ½ PCG. Performing gate transmission in the unit of ½ PCG is to increase a rate of downlink power control and decrease the influence of delay.

The rate and delay of downlink power control for the duty cycle DC=½ when performing gated transmission in the unit of ½ PCG is equal to the rate and delay of downlink power control for the case where gated transmission is not performed. The rate and delay of the downlink power control for DC=¼ when performing gated transmission in the unit of ½ PCG is equal to the rate and delay of the downlink power control for the case where gated transmission is performed in the unit of the PCG at DC=½. Therefore, compared with the case where gated transmission is performed in the unit of the PCG, it is possible to improve performance of the downlink power control by performing gated transmission in the unit of ½ PCG, and also improve downlink cell capacity and receiving performance.

Referring to FIG. 11A, reference numeral 10 shows a method for regularly transmitting every other ½ PCG, when an uplink DPCCH undergoes gated transmission in the unit of ½ PCG and DC=½. Specifically, gated transmission is performed in the order of the second half of the $0^{th}$ slot, the second half of the $1^{st}$ slot, the second half of the $2^{nd}$ slot, . . . , the second half of $15^{th}$ slot. Reference numeral 20 shows a method for transmitting only ½ PCG of every second PCG, when the uplink DPCCH undergoes gated transmission in the unit of ½ PCG and DC=¼. Specifically, gated transmission is performed in the order of the second half of the $1^{st}$ slot, the second half of the $3^{rd}$ slot, the second half of the $5^{th}$ slot, . . . , the second half of $15^{th}$ slot. Reference numeral 30 shows a method for transmitting only ½ PCG of every fourth PCG, when the uplink DPCCH undergoes gated transmission in the unit of ½ PCG and DC=⅛. Specifically, gated transmission is performed in the order of the second half of the $3^{rd}$ slot, the second half of the $7^{th}$ slot, the second half of the $11^{th}$ slot, . . . , the second half of $15^{th}$ slot. The slot positions where transmission occurs may be varied. Although the description has been made with reference to an example where gated transmission is performed at the second half of one slot, it is also possible to perform gated transmission at the first half of one slot.

A mobile station transmitter for gating transmission of the uplink DPCCH in the unit of ½ PCG as shown in FIG. 11A has the same structure as the mobile station transmitter shown in FIG. 4B. However, the gated transmission controller 241 has different operation. That is, the gated transmission controller 241 which performs gated transmission in the unit of ½ PCG, gates transmission of ½ PCG including the pilot symbol and the TFCI, FBI and TPC bits at a predetermined ½ PCG position.

That is, the mobile station of FIG. 4B transmits a frame comprised of a plurality of slots to the base station over the uplink DPCCH at a duration where there is no transmission message. At this point, each slot in the frame is divided into a first slot duration and a second slot duration, and the gated transmission controller 241 provides a power control signal to the first slot duration and provides no signal to a part of the second slot duration.

Figure 11B:
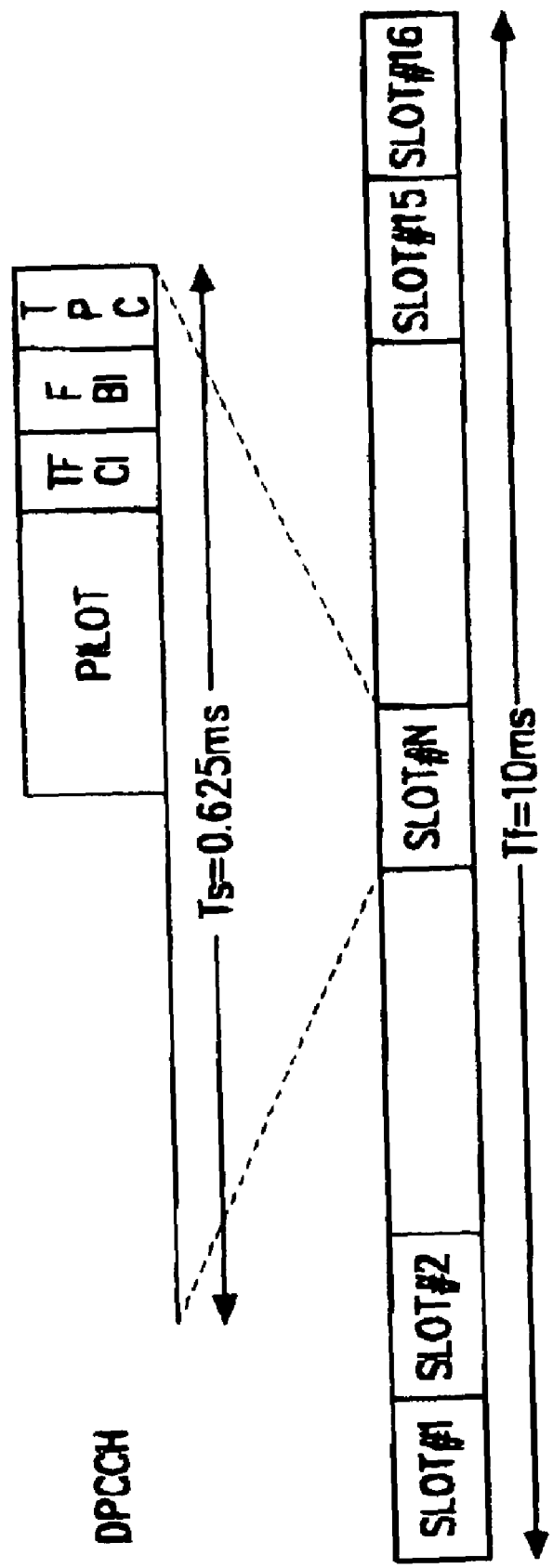
FIG. 11B is a diagram illustrating a structure of a power control group when a gated transmission unit of an uplink DPCCH is ½ the power control group in a gating mode according to an embodiment of the present invention.

FIG. 11B shows a PCG structure of the DPCCH used when the uplink DPCCH is gated in the unit of ½ PCG. Referring to FIG. 11B, when gated transmission is performed in the unit of ½ PCG, there is no symbol in the first half of the PCG and the second half of the PCG is comprised of the pilot, TFCI, FBI and TPC symbols. Tables 4A, 4B and 4C below show the symbols constituting an uplink DPCCH field. In Tables 4A, 4B and 4C, $N_{pilot}$, $N_{TPC}$, $N_{TFCI}$, and $N_{FBI}$ indicate the number of the pilot, TPC, TPCI and FBI bits included in each slot, respectively.

TABLE 4A

|  | $N_{pilot}$ | $N_{TPC}$ | $N_{TFCI}$ | $N_{FBI}$ |
|---|---|---|---|---|
| Non Gated TX | 8 | 2 | 0 | 0 |
| Gated TX | 3 | 2 | 0 | 0 |
|  | 4 | 1 | 0 | 0 |

TABLE 4B

|  | $N_{pilot}$ | $N_{TPC}$ | $N_{TFCI}$ | $N_{FBI}$ |
|---|---|---|---|---|
| Non Gated TX | 7 | 2 | 0 | 1 |
| Gated TX | 2 | 2 | 0 | 1 |

TABLE 4C

|  | $N_{pilot}$ | $N_{TPC}$ | $N_{TFCI}$ | $N_{FBI}$ |
|---|---|---|---|---|
| Non Gated TX | 6 | 2 | 0 | 2 |
| Gated TX | 3 | 1 | 0 | 1 |

As shown in Tables 4A, 4B and 4C, during gated transmission, the bit number of other fields is maintained and only the pilot symbol may not be transmitted at the first half of the slot and the number of the pilot symbols may be varied, compared with the case where gated transmission is not performed. During gated transmission, the bit number of each field may be either fixed to a predetermined value, or indicated by a message provided from the base station. It is also possible to determine the number of fields for gated transmission in a similar manner, even for a case other than those shown in Tables 4A, 4B and 4 FIG. 11C shows an uplink DPCCH message transmitted when a message to be transmitted over the uplink DPDCH is generated in a gating mode in the unit of ½ PCG according to an embodiment of the present invention.

Figure 11C:
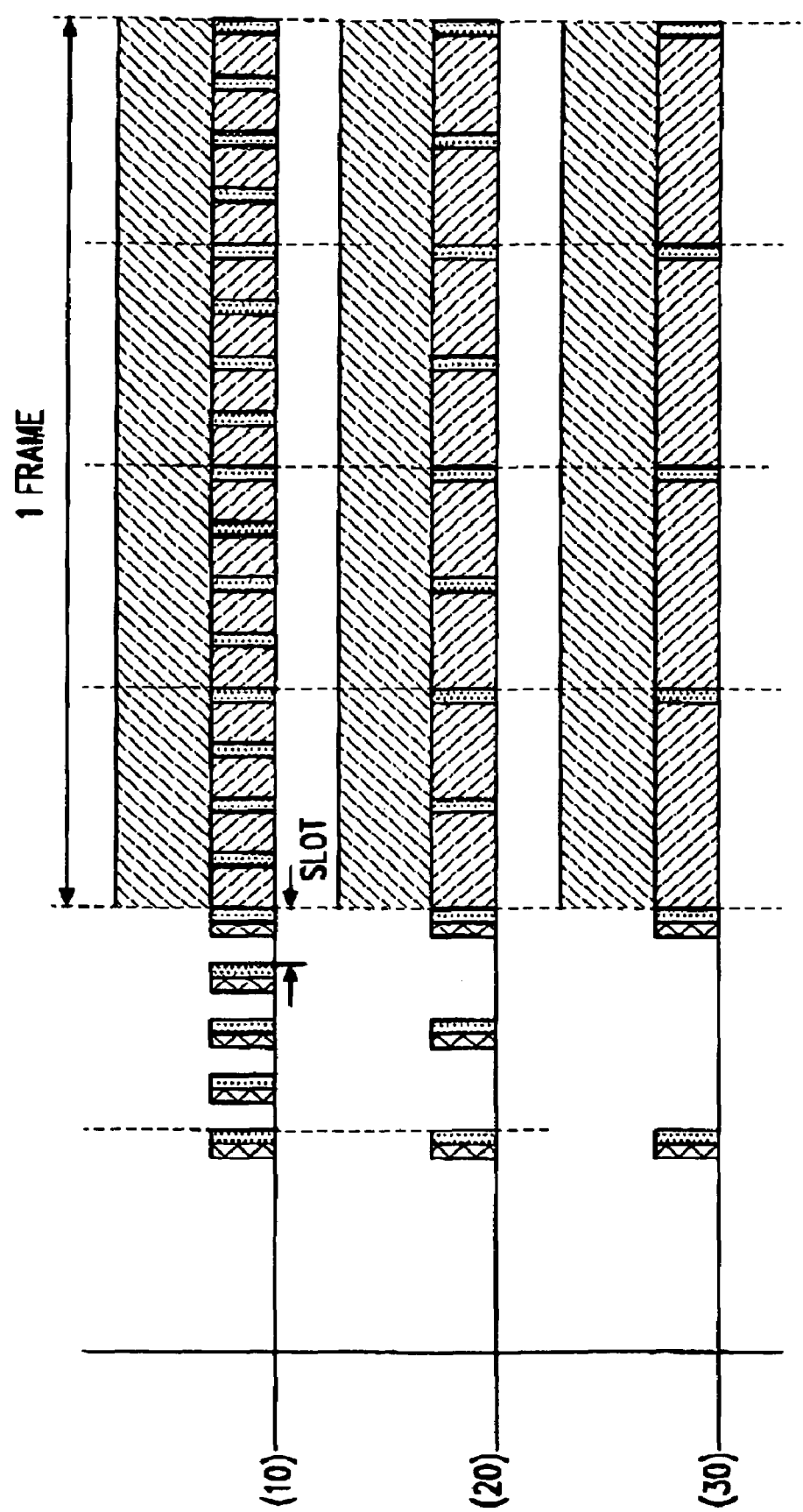
FIG. 11C is a diagram illustrating a method for transmitting a signal when an uplink DPDCH message is generated while transmitting an uplink DPCCH at a gating rate of ½ the power control group in a gating mode according to an embodiment of the present invention.

Referring to FIG. 11C, reference numeral 10 shows an uplink DPDCH message generated while performing DC=½ gated transmission on the uplink DPCCH. Reference numeral 20 shows an uplink DPDCH message generated while performing DC=¼ gated transmission on the uplink DPCCH. Reference numeral 30 shows an uplink DPDCH message generated while performing DC=⅛ gated transmission. When transmitting the uplink DPDCH message, the gated portion of the uplink DPCCH is filled with the pilot symbol before transmission. Transmission of the TFCI, FBI, TPC fields is optional.

As described above, the invention minimizes the time required for the sync reacquisition process in the base station, minimizes an increase in interference and a decrease in the mobile station using time due to continuous transmission of the uplink DPCCH, and minimizes an increase in interference due to transmission of the uplink power control bit over the downlink, thereby to increase the capacity. In addition, it is possible to improve downlink cell capacity and receiving performance by gating transmission of the uplink DPCCH at a partial duration of the power control group.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting control information in a mobile station of a mobile communication system which transmits the control information filled in a frame on a dedicated physical control channel, the frame being divided into a plurality of slots, the method comprising the steps of:
   determining whether there is dedicated physical data channel data to transmit to a base station; and
   gating transmission of the control information in a partial duration of a predetermined one of the slots of the dedicated physical control channel when there is no dedicated physical data channel data to transmit for a predetermined time.

2. The method as claimed in claim 1, wherein the control information includes a power control signal.

3. The method as claimed in claim 1, wherein the control information includes pilot symbols, transport format combination indicator (TFCI) bits, and feedback information (FBI) bits for a phase difference between at least two transmit diversity antennas used by the base station.

4. A mobile station transmitter for a mobile communication system, comprising:
- a dedicated physical control channel (DPCCH) for transmitting control information including a power control signal;
- a dedicated physical data channel (DPDCH) for transmitting user data or signaling data;
- a switch for gating a signal on the dedicated control channel; and
- a controller for gating the switch such that when there is no dedicated data channel signal to be transmitted to a base station for a predetermined time, the control information is transmitted in a partial duration of a predetermined one of slots constituting a frame.

5. The mobile station transmitter as claimed in claim 4, wherein the control information includes pilot symbols, transport format combination indicator (TFCI) bits, and feedback information (FBI) bits for a phase difference between at least two transmit diversity antennas used by the base station.

* * * * *